(12) United States Patent
Nomichi et al.

(10) Patent No.: US 8,413,951 B2
(45) Date of Patent: Apr. 9, 2013

(54) VALVE DEVICE

(75) Inventors: Kaoru Nomichi, Ono (JP); Yutaka Suzuki, Kobe (JP); Makoto Ninomiya, Kobe (JP); Hiroshi Ito, Akashi (JP)

(73) Assignees: Kabushiki Kaisha Kawasaki Precision Machinery, Kobe-shi (JP); Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 12/281,305

(22) PCT Filed: Feb. 21, 2007

(86) PCT No.: PCT/JP2007/053185
§ 371 (c)(1),
(2), (4) Date: Dec. 1, 2008

(87) PCT Pub. No.: WO2007/099831
PCT Pub. Date: Sep. 7, 2007

(65) Prior Publication Data
US 2009/0236551 A1   Sep. 24, 2009

(30) Foreign Application Priority Data
Mar. 2, 2006  (JP) .................................. 2006-056895

(51) Int. Cl.
*F16K 31/06* (2006.01)
*F16K 31/10* (2006.01)
*G05D 23/02* (2006.01)
*F16K 17/38* (2006.01)

(52) U.S. Cl. ........... 251/129.04; 251/129.09; 251/129.1; 137/79; 137/468; 236/93 R

(58) Field of Classification Search ............. 251/129.09, 251/129.04, 129.1; 137/551, 79, 468; 236/93 R
See application file for complete search history.

(56) References Cited

U.S. PATENT DOCUMENTS 2,414,127 A * 1/1947 Shaw .............................. 169/38
2,601,868 A * 7/1952 Gill ............................. 137/110
(Continued)

FOREIGN PATENT DOCUMENTS

| DE | 10051433 A1 | 5/2002 |
| GB | 1042003 A | 9/1966 |

(Continued)

OTHER PUBLICATIONS

International Search Report for PCT/JP2007/053185, mailed Mar. 20, 2007.

(Continued)

*Primary Examiner* — John K Fristoe, Jr.
*Assistant Examiner* — Jonathan Waddy
(74) *Attorney, Agent, or Firm* — Marshall, Gerstein & Borun LLP

(57) ABSTRACT

A valve device includes a temperature sensor disposed to project from a housing to a tank inner space to detect the temperature in the tank inner space, and can detect the temperature without being influenced by the heat capacity of the housing. A coil generates a magnetic force to drive a valve with three terminals arranged at different positions in an axial direction, and a drive voltage is selectively applied between two of the terminals. A current value of the driving current which energizes the coil can be changed by selecting the terminals between which the drive voltage is applied. Without controlling the drive voltage, it is possible to suppress wasting power such that the driving current of the large current value is generated in the start-up time, and the current value of the driving current is decreased in the holding time.

6 Claims, 15 Drawing Sheets

U.S. PATENT DOCUMENTS

| | | | | |
|---|---|---|---|---|
| 3,942,485 A | * | 3/1976 | Suda et al. | 123/490 |
| 4,342,443 A | * | 8/1982 | Wakeman | 251/129.08 |
| 4,948,093 A | * | 8/1990 | Sugawara et al. | 251/129.15 |
| 4,964,571 A | * | 10/1990 | Taue et al. | 239/88 |
| 4,970,872 A | | 11/1990 | Berwanger et al. | 62/205 |
| 5,235,954 A | * | 8/1993 | Sverdlin | 123/447 |
| 5,509,441 A | * | 4/1996 | Platusich | 137/375 |
| 5,562,117 A | | 10/1996 | Borland et al. | |
| 5,749,391 A | * | 5/1998 | Loutzenhiser | 137/204 |
| 5,752,489 A | * | 5/1998 | Henderson et al. | 123/494 |
| 5,992,391 A | * | 11/1999 | Yamakado et al. | 123/490 |
| 6,120,005 A | * | 9/2000 | Wright | 251/129.1 |
| 6,550,458 B2 | * | 4/2003 | Yamakado et al. | 123/490 |
| 6,575,194 B1 | | 6/2003 | Miller et al. | |
| 6,968,859 B1 | * | 11/2005 | Nagano et al. | 137/554 |
| 7,210,496 B2 | * | 5/2007 | Suzuki | 137/338 |
| 7,527,072 B2 | * | 5/2009 | Crnkovich | 137/625.34 |
| 2002/0104673 A1 | | 8/2002 | Miller et al. | |
| 2002/0108656 A1 | | 8/2002 | Miller et al. | |
| 2003/0066836 A1 | | 4/2003 | Sakaguchi et al. | |
| 2004/0060354 A1 | * | 4/2004 | Watanabe et al. | 73/204.22 |
| 2004/0108395 A1 | * | 6/2004 | Hamada et al. | 239/585.1 |
| 2005/0073795 A1 | | 4/2005 | Maekawa et al. | |

FOREIGN PATENT DOCUMENTS

| | | |
|---|---|---|
| JP | 58-2466 | 1/1983 |
| JP | 2-127869 | 10/1990 |
| JP | 2002-349709 | 12/2002 |
| JP | 2004-332790 | 11/2004 |
| JP | 2005-083533 | 3/2005 |
| JP | 2006-275179 | 10/2006 |

OTHER PUBLICATIONS

Office Action for Canadian Patent Application No. 2,637,769, dated May 25, 2010.

English explanation for Japanese Laid-Open Utility Model Application Publication No. SHO 58-2466.

English explanation for Japanese Laid-Open Utility Model Application Publication No. HEI 2-127869.

Extended European Search Report for EP 07714685.0, dated Aug. 2, 2011.

* cited by examiner

VALVE DEVICE

TECHNICAL FIELD

The present invention relates to a valve device disposed at a pressure apparatus, such as a high pressure gas apparatus.

BACKGROUND ART

FIG. 10 is a cross-sectional view taken along a plane including an axis of a part of a solenoid valve 500 of the prior art. The solenoid valve 500 that is a valve device of the prior art is disposed such that a part thereof is inserted into an opening 502 of a tank 501 of a natural gas vehicle or a fuel cell vehicle. The solenoid valve 500 is a normally closed valve. By energizing a coil 503, the solenoid valve 500 drives a valve 504 to open a valve passage 505. A feeder wire member 507 for energizing the coil 503 is disposed to be inserted through and supported by a housing 506. With this, the feeder wire member 507 is protected from externally applied vibrations and impacts. Thus, the reliability of the vibration resistance and impact resistance of the feeder wire member 507 can be increased. In addition, by storing the feeder wire member 507 in the housing 506, the feeder wire member 507 can be disposed neatly. A valve device similar to the solenoid valve 500 is disclosed in, for example, Patent Document 1.

FIG. 11 is a cross-sectional view simplistically showing the solenoid valve 500. FIG. 12 is a cross-sectional view showing an enlarged vicinity of a temperature sensor 510 of the solenoid valve 500. The housing 506 has a gas introducing hole 511 which is open to an inner space of the tank 501 and extends to a position outside the tank 501. Further, the housing 506 has a sensor inserting hole 512 which is connected to the gas introducing hole 511. The temperature sensor 510 is inserted in the sensor inserting hole 512. The temperature sensor 510 is configured such that a sensor main body 514 is inserted into a bottomed protecting tube 513. The temperature sensor 510 can detect the temperature of a gas in the tank 501.

FIG. 13 is a cross-sectional view taken along a plane perpendicular to the axis of the solenoid valve 500. FIG. 14 is a circuit diagram showing the coil 503. In the solenoid valve 500, two feeder wire members 507 are supported by the housing 506 and are electrically connected to both end portions 503a and 503b, respectively, of the coil 503.

Patent Document 1: Japanese Laid-Open Patent Application Publication 2005-83533

DISCLOSURE OF THE INVENTION

Problems to be Solved by the Invention

In the solenoid valve 500 of the prior art, the temperature sensor 510 is disposed at a portion of the housing 506 which portion projects from the tank 501, to detect the temperature of a gas in the gas introducing hole 511. Therefore, the temperature sensor 510 cannot directly detect the temperature of the gas in the tank 501. In addition, since the temperature sensor 510 is supported by the housing 506, it is influenced by a heat capacity of the housing 506. On this account, the response of the temperature sensor 510 to temperature changes of the gas in the tank 501 deteriorates. Further, since the temperature sensor 510 is configured such that the protecting tube 513 covers the sensor main body 514, the temperature sensor 510 is influenced by a heat capacity of the protecting tube 513. On this account, the response of the temperature sensor 510 to temperature changes of the gas in the tank 501 deteriorates.

FIG. 15 are graphs showing a driving current for energizing the coil 503. The solenoid valve 500 is configured to apply a drive voltage between both end portions 503a and 503b of the coil 503. In the case of energizing the coil 503 to drive the valve 504, a comparatively large driving current is necessary in a start-up time in which the valve 504 is displaced from a closed position to an open position, and a necessary driving current is comparatively small in a holding time in which the valve 504 is held at the open position after it has been displaced to the open position. In this configuration, as shown in FIG. 15(1), if a certain drive voltage is applied to the coil 503 to generate a certain driving current at the coil 503, large electric power is consumed in the holding time as with in the start-up time. This wastes the electric power. In contrast, as shown in FIG. 15(2), if a large driving current is generated only in the start-up time and the driving current is made small in the holding time, it is possible to suppress wasting the electric power. However, it becomes necessary to control the driving current by controlling the drive voltage, it becomes inconvenient in handling.

Thus, since the solenoid valve 500 that is the valve device of the prior art is inconvenient, there is a need for the improvement of convenience of the valve device.

Means for Solving the Problems

An object of the present invention is to provide a convenient valve device.

The present invention is a valve device including: a housing which is attached to a pressure apparatus handling fluid, to be partially exposed from the pressure apparatus, and which has a valve passage of causing an inner space and outer space of the pressure apparatus to be connected to each other; a valve which is disposed to be displaceable in the housing, and is displaced to change an opening degree of the valve passage; temperature detecting means disposed to project from the housing into the inner space of the pressure apparatus, for detecting a temperature of the fluid in the inner space of the pressure apparatus; and a signal wire member which extends from a portion of the housing exposed in the outer space of the pressure apparatus to a portion of the housing exposed in the inner space of the pressure apparatus, to be inserted through the housing, thereby being supported by the housing, and which is electrically connected to the temperature detecting means.

In accordance with the present invention, the temperature detecting means is disposed in the valve device which changes the opening degree of the valve passage by the displacement of the valve in the housing. The temperature detecting means projects from the housing to the inner space of the pressure apparatus to detect the temperature of the fluid in the inner space of the pressure apparatus. Further, the valve device is provided with the signal wire member which extends from the portion of the housing exposed from the pressure apparatus, to the portion of the housing exposed in the inner space of the pressure apparatus. Moreover, the signal wire member is electrically connected to the temperature detecting means. With this, the temperature detecting means can be disposed in the inner space of the pressure apparatus to directly detect the temperature of the fluid in the inner space, and the signal indicating the detected temperature can be output to the outer space of the pressure apparatus through the signal wire member. Thus, the fluid is not introduced into the housing in order to detect the temperature of the fluid, but the temperature detecting means is disposed in the inner space to detect the temperature of the fluid in the inner space. Therefore, the temperature detecting means can detect the temperature of the fluid without being influenced by the heat capacity of the housing. On this account, the response of the temperature detecting means to the gas temperature changes can be made satisfactory.

Further, the signal wire member for realizing the temperature detection by the temperature detecting means disposed in the inner space is inserted through the housing to be supported by the housing. With this, the signal wire member is protected from externally applied vibrations and impacts. Thus, the reliability of the vibration resistance and impact resistance of the signal wire member can be increased. Moreover, by storing the signal wire member in the housing, the signal wire member can be disposed neatly.

Moreover, the valve device of the present invention further includes sealing means for sealing between the housing and the signal wire member.

In accordance with the present invention, the sealing means seals between the housing and the signal wire member. With this, it is possible to prevent the fluid from leaking from between the housing and the signal wire member. Further, the temperature detecting means can be configured such that the temperature sensing portion for sensing the temperature is not covered by a protecting tube or the like but is exposed in the inner space. Thus, it is possible to reduce the heat capacity of the temperature detecting means itself. With this, the response of the temperature detecting means to the temperature changes of the fluid can be improved.

Moreover, the valve device of the present invention further includes: solenoid driving means including a coil, for generating a magnetic force by energization of the coil to drive the valve to be displaced by the magnetic force; and feeder wire members which extend from the portion of the housing exposed in the outer space of the pressure apparatus to a portion of the housing where the coil is disposed, to be inserted through the housing, thereby being supported by the housing, which are electrically connected to three or more different connecting points, respectively, of the coil which points are arranged in an axial direction, and which guide electric power for selectively applying a drive voltage between two of the connecting points.

In accordance with the present invention, the coil of the solenoid driving means is energized to generate the magnetic force, thereby driving the valve to be displaced. Further, the feeder wire members are disposed to guide electric power to the coil of the solenoid driving means, thereby energizing the coil. The feeder wire members are electrically connected to three or more different connecting points, respectively, of the coil which points are arranged in the axial direction, and can selectively apply the drive voltage between two of the connecting points. With this, without controlling the drive voltage, the driving current for energizing the coil can be changed by selecting the connecting points to which the drive voltage is applied. Therefore, without controlling the drive voltage, by selecting the connecting points to which the drive voltage is applied, it is possible to suppress wasting the electric power in such a manner that the large driving current is generated in the start-up time, and the driving current is made small in the holding time.

Further, the feeder wire member for guiding the electric power is inserted through the housing to be supported by the housing. With this, the feeder wire member is protected from externally applied vibrations and impacts. Thus, the reliability of the vibration resistance and impact resistance of the feeder wire member can be increased. Moreover, by storing the feeder wire member in the housing, the feeder wire member can be disposed neatly.

Moreover, a valve device of the present invention includes: a housing which is attached to a pressure apparatus handling fluid, to be partially exposed from the pressure apparatus, and which has a valve passage of causing an inner space and outer space of the pressure apparatus to be connected to each other; a valve which is disposed to be displaceable in the housing, and is displaced to change an opening degree of the valve passage; solenoid driving means including a coil, for generating a magnetic force by energization of the coil to drive the valve to be displaced by the magnetic force; and feeder wire members which extend from the portion of the housing exposed in the outer space of the pressure apparatus to a portion of the housing where the coil is disposed, to be inserted through the housing, thereby being supported by the housing, which are electrically connected to three or more different connecting points, respectively, of the coil which points are arranged in an axial direction, and which guide electric power for selectively applying a drive voltage between two of the connecting points.

In accordance with the present invention, the solenoid driving means is disposed in the valve device which changes the opening degree of the valve passage by the displacement of the valve in the housing. The coil of the solenoid driving means is energized to generate the magnetic force, thereby driving the valve to be displaced. Further, the feeder wire members are disposed to guide electric power to the coil of the solenoid driving means, thereby energizing the coil. The feeder wire members are electrically connected to three or more different connecting points, respectively, of the coil which are arranged in the axial direction, and can selectively apply the drive voltage between two of the connecting points. With this, without controlling the drive voltage, the driving current for energizing the coil can be changed by selecting the connecting points to which the drive voltage is applied. Therefore, without controlling the drive voltage, by selecting the connecting points to which the drive voltage is applied, it is possible to suppress wasting the electric power in such a manner that the large driving current is generated in the start-up time, and the driving current is made small in the holding time.

Further, the feeder wire member for guiding the electric power is inserted through the housing to be supported by the housing. With this, the feeder wire member is protected from externally applied vibrations and impacts. Thus, the reliability of the vibration resistance and impact resistance of the feeder wire member can be increased. Moreover, by storing the feeder wire member in the housing, the feeder wire member can be disposed neatly.

Effects of the Invention

In accordance with the present invention recited in claim 1, since the temperature detecting means is disposed in the inner space to detect the temperature of the fluid in the inner space, the temperature detecting means can detect the temperature of the fluid without being influenced by the heat capacity of the housing. Therefore, it is possible to obtain a convenient valve device whose response to the temperature changes of the fluid is satisfactory.

In accordance with the present invention recited in claim 2, the temperature detecting means can be configured such that the temperature sensing portion which senses the temperature is exposed in the inner space, and the heat capacity of the temperature detecting means itself can be made small. Thus, it is possible to obtain high response of the temperature detecting means to the temperature changes of the fluid.

In accordance with the present invention recited in claims 3 and 4, without controlling the drive voltage, the driving current for energizing the coil can be changed by selecting the connecting points to which the drive voltage is applied. Therefore, it is possible to suppress wasting the electric power in such a manner that the large driving current is generated in the start-up time and the driving current is made small in the holding time by selecting the connecting points to which the drive voltage is applied, without controlling the drive voltage. Thus, it is possible to obtain a convenient valve device which can suppress wasting the electric power without controlling the drive voltage.

Figure 1:
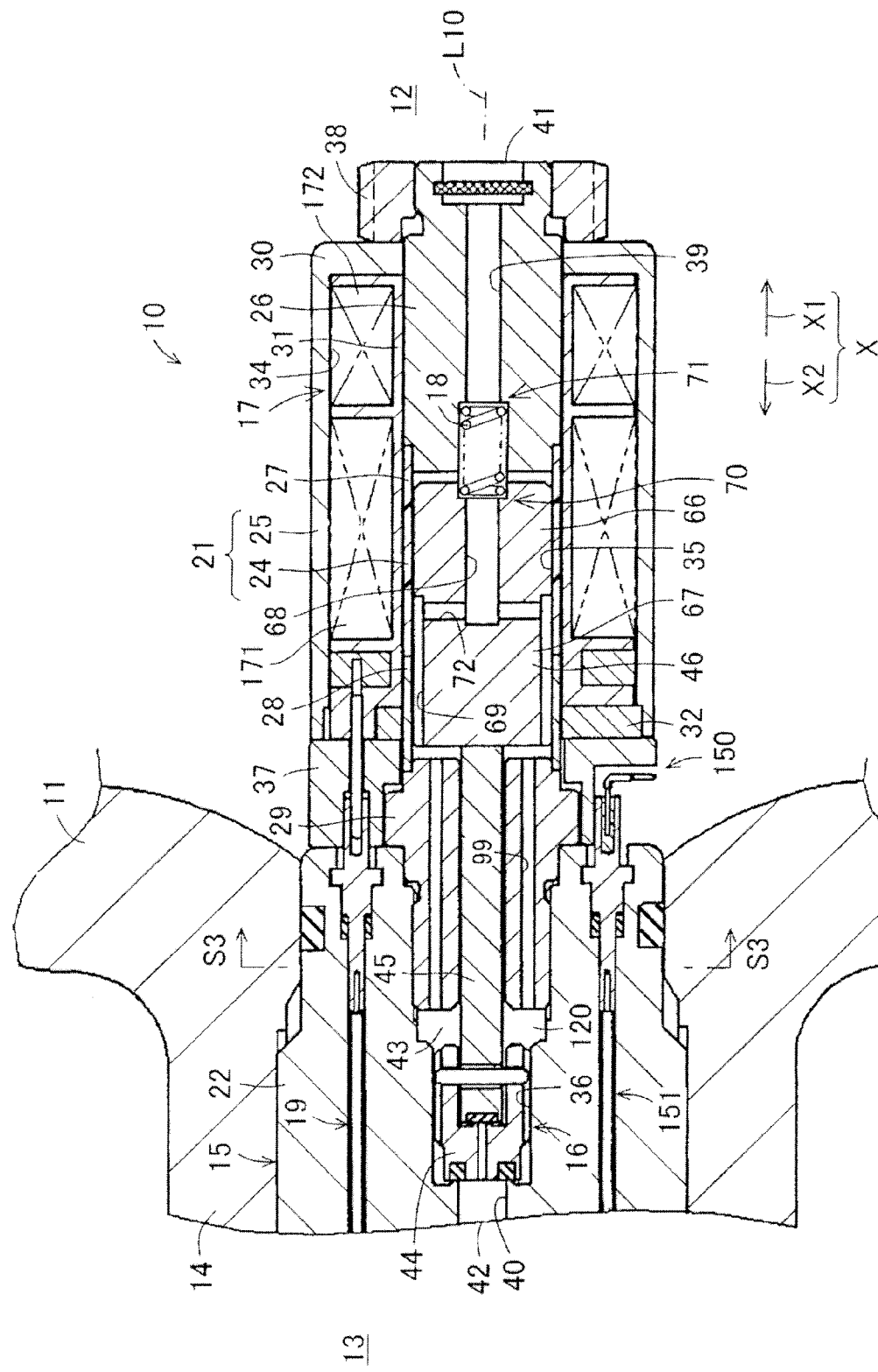
FIG. 1 is a cross-sectional view showing a solenoid on-off valve 10 of one embodiment of the present invention.

EXPLANATION OF REFERENCE NUMBERS 10 solenoid on-off valve
11 tank
15 housing
16 valve
17 coil
18 drive coil spring
19 feeder wire member
44 main valve
45 pilot valve
75 first feeder piece (terminal pin)
76 second feeder piece
88 feeder line
89 feeder line terminal socket
150 temperature sensor
151 signal wire member
155 signal wire
156 signal wire terminal socket
160 temperature sensing portion
161 sensor lead wire
163 sensor disposing concave portion
177 protecting tube

BEST MODE FOR CARRYING OUT THE INVENTION

FIG. 1 is a cross-sectional view showing a solenoid on-off valve 10 of one embodiment of the present invention. The solenoid on-off valve 10 is a valve device disposed at a pressure apparatus which handles a gas that is fluid. The pressure apparatus is, for example, pressure vessel, and more specifically, a high-pressure gas tank (hereinafter simply referred to as "tank") 11. The solenoid on-off valve 10 is especially preferably used for the tank 11, such as a fuel tank of a natural gas vehicle or a fuel tank of a fuel cell vehicle, which stores the fuel gas.

The solenoid on-off valve 10 controls to discharge the gas from an inner space (hereinafter referred to as "tank inner space") 12 of the tank 11 to an outer space (hereinafter referred to as "tank outer space") 13 of the tank 11 which is lower in pressure than the tank inner space 12. More specifically, the solenoid on-off valve 10 is disposed at an opening 14 of the tank 11 to switch between a state of allowing the discharge of gas and a state of stopping the discharge of gas.

The solenoid on-off valve 10 includes a housing 15, a valve 16, a coil 17, a drive spring member 18, feeder wire members 19, a temperature sensor 150 and signal wire members 151. The solenoid on-off valve 10 is configured such that the valve 16, the coil 17, the feeder wire members 19, the drive spring member 18 and the signal wire members 151 are supported by the housing 15, and the temperature sensor 150 is disposed to project from the housing 15 to the tank inner space 12. The solenoid on-off valve 10 has a predetermined reference axis L10, and is disposed such that where first and second directions (hereinafter referred to as "axial direction") X1 and X2 are in parallel with the reference axis L10, a first axial direction X1 side portion thereof is disposed in the tank inner space 12, and a second axial direction X2 side portion thereof is exposed in the tank outer space 13.

The housing 15 is configured such that a plurality of housing portions are coupled to one another, and in the present embodiment, first and second housing portions 21 and 22 are coupled to each other. The housing 15 has an axis which coincides with the reference axis L10. The housing 15 is provided with the first housing portion 21 on the first axial direction X1 side and the second housing portion 22 on the second axial direction X2 side.

The first housing portion 21 includes an insertion body 24 and an outer body 25. The insertion body 24 includes a fixed magnetic pole member 26, a non-magnetic guide member 27, a magnetic guide member 28 and a coupling tube member 29. The fixed magnetic pole member 26 is made of a ferromagnetic material, such as steel, and has a substantially cylindrical shape. The non-magnetic guide member 27 is made of a non-magnetic material, and has a cylindrical shape. The magnetic guide member 28 is made of a magnetic material, such as steel, and has a cylindrical shape. The coupling tube member 29 is formed to have a substantially cylindrical shape.

The non-magnetic guide member 27 and the magnetic guide member 28 are substantially equal in inner diameter, outer diameter and thickness as each other, and the inner diameter of the magnetic guide member 28 is larger than the inner diameter of the non-magnetic guide member 27. Moreover, each of the non-magnetic guide member 27 and the magnetic guide member 28 has the outer diameter that is substantially equal to each of an average outer diameter of the fixed magnetic pole member 26 and an average outer diameter of the coupling tube member 29.

The fixed magnetic pole member 26, the non-magnetic guide member 27, the magnetic guide member 28 and the coupling tube member 29 are arranged in this order from the first axial direction X1 side to the second axial direction X2 side, and are mechanically coupled to one another by bonding or welding to be integral with one another. In this manner, the insertion body 24 is configured to have a bottomed tubular shape and a first housing concave portion 35 which is open in the second axial direction X2.

The outer body 25 includes a solenoid case member 30 and a coil bobbin member 31. The solenoid case member 30 has a cylindrical shape including an inwardly extending flange portion at a first axial direction X1 side end portion thereof. The coil bobbin member 31 has a cylindrical shape including outwardly extending flange portions at its both end portions and intermediate portion in the axial direction. The inner diameter of the solenoid case member 30 excluding the flange portion is larger than the outer diameter of the coil bobbin member 31 excluding the flange portions.

The solenoid case member 30 and the coil bobbin member 31 are coupled to each other such that the coil bobbin member 31 is inserted into the solenoid case member 30 from the second axial direction X2 side, and a yoke member 32 is fitted to a second axial direction X2 side end portion of the solenoid case member 30 so that the coil bobbin member 31 does not disengage therefrom. Thus, the outer body 25 having a cylindrical shape is constructed. The outer body 25 includes a coil chamber 34 defined by the solenoid case member 30 and the coil bobbin member 31, and is disposed to be externally fitted to the insertion body 24 at a position from the fixed magnetic pole member 26 to the magnetic guide member 28.

The second housing portion 22 is provided with a second housing concave portion 36 which is formed along the reference axis L10 to open in the first axial direction X1. An internal thread is formed on an inner periphery of a first axial direction X1 side end portion of the second housing portion 22.

An external thread is formed on an outer periphery of a second axial direction X2 side portion of the coupling tube member 29 constituting the insertion body 24 of the first housing portion 21. The coupling tube member 29 is threadedly engaged with the second housing portion 22. Thus, the insertion body 24 of the first housing portion 21 is coupled to the second housing portion 22.

An external thread is formed on an outer periphery of a first axial direction X1 side end portion of the fixed magnetic pole member 26 constituting the insertion body 24 of the first housing portion 21. With the insertion body 24 coupled to the second housing portion 22, the outer body 25 is externally fitted to the insertion body 24. An annular resin spacer 37 is disposed between the outer body 25 and the second housing portion 22, and a fixing nut member 38 on which an internal thread is formed is threadedly engaged with the fixed magnetic pole member 26.

With this, the second housing portion 22 and the fixing nut member 38 sandwich the outer body 25 and the spacer 37 to fix the outer body 25 and the spacer 37. Thus, the first and second housing portions 21 and 22 are coupled to each other to constitute the housing 15, and the first and second housing concave portions 35 and 36 forms a valve chamber space 120 in the housing 15.

A primary passage 39 is formed in the fixed magnetic pole member 26 constituting the insertion body 24 of the first housing portion 21 so as to penetrate through the fixed magnetic pole member 26 along the reference axis L10. Moreover, a secondary passage 40 is formed in the second housing portion 22 so as to penetrate through the second housing portion 22 along the reference axis L10. The valve chamber space 120 is connected to the tank inner space 12, i.e., an outer space of the housing 15 via the primary passage 39 and is connected to the tank outer space 13, i.e., an outer space of the housing 15 via the secondary passage 40.

An opening of the primary passage 39 which is open to the tank inner space 12 is a primary port 41, and an opening of the secondary passage 40 which is open to the tank outer space 13 is a secondary port 42. Moreover, the valve 16 and the like are disposed in the valve chamber space 120. In this state, the valve chamber space 120, the primary passage 39 and the secondary passage 40 forms a valve passage 43. Thus, the primary port 41, the secondary port 42 and the valve passage 43 are formed in the housing 15, and the primary port 41 and the secondary port 42 are connected to each other by the valve passage 43. Although the secondary port 42 is not shown in FIG. 1, reference number "42" which denotes the secondary port is shown at the end of the secondary passage 40 in FIG. 1 for ease of understanding.

Figure 2:
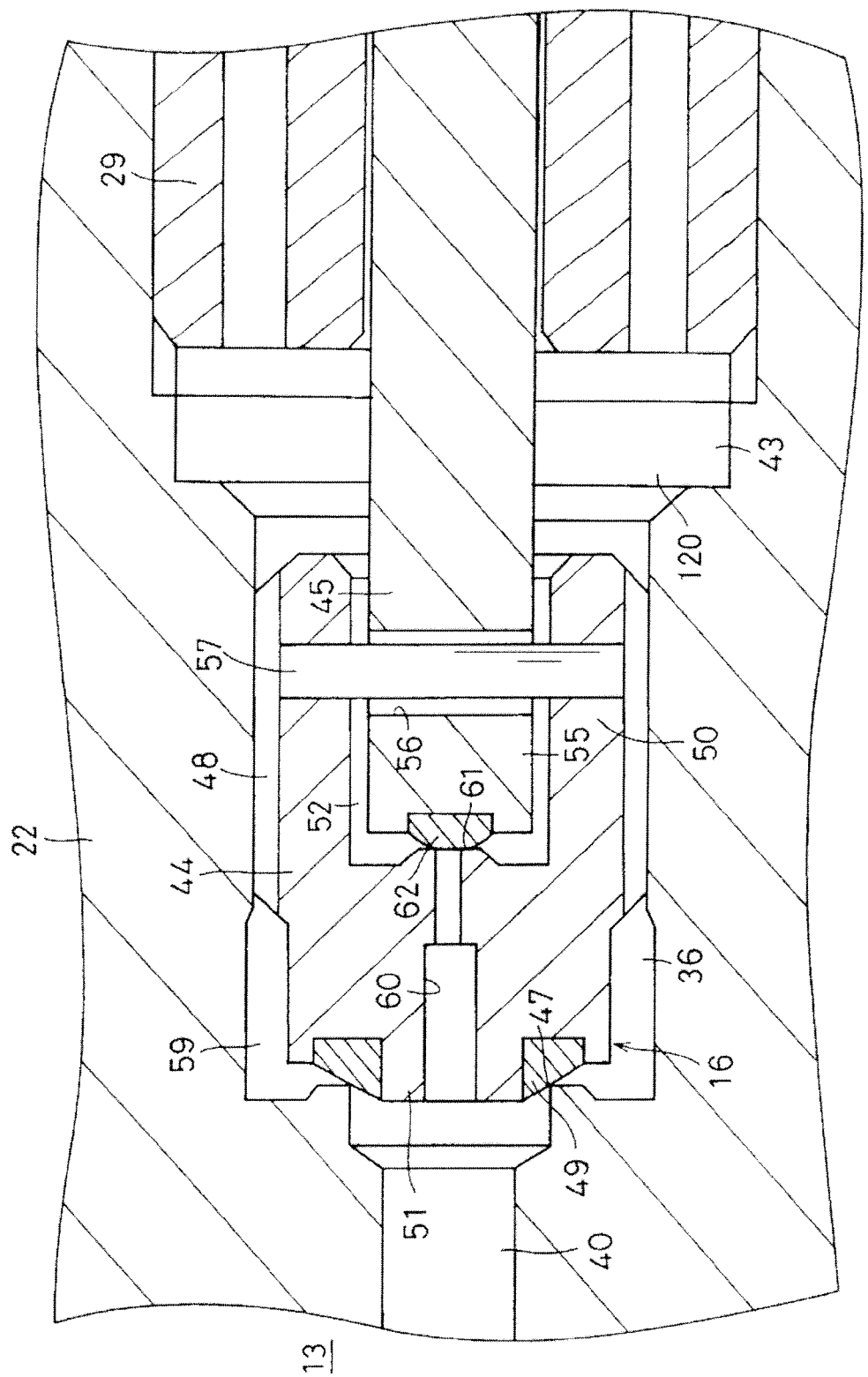
FIG. 2 is a cross-sectional view showing an enlarged vicinity of a valve of FIG. 1.

FIG. 2 is a cross-sectional view showing an enlarged vicinity of the valve 16 of FIG. 1. Referring to FIGS. 1 and 2, the valve 16 is means for opening and closing the valve passage 43, and includes a main valve 44, a pilot valve 45 and a movable core 46. The pilot valve 45 and the movable core 46 are formed integrally, and the main valve 44 and an integral structure of the pilot valve 45 and the movable core 46 are mutually displaceable. Thus, the valve 16 is constructed as a two-stage valve. The main valve 44, the pilot valve 45 and the movable core 46 have axes coinciding with the reference axis L10, and are disposed in the valve chamber space 120 to be coaxial with the housing 15.

The main valve 44 includes a tubular portion 50 and a bottom portion 51 closing one end portion of the tubular portion 50, and has a substantially bottomed tubular shape. The main valve 44 fits in the second housing portion 22 such that the bottom portion 51 is located on the second axial direction X2 side. In addition, the main valve 44 is supported by the second housing portion 22 so as to be displaceable in the axial directions X1 and X2.

The second housing portion 22 is provided with a main valve seat 47 which surrounds an opening of the secondary passage 40 which is open to the valve chamber space 120. The main valve 44 is provided with a main valve seat portion 49 at the bottom portion 51. The main valve 44 is displaceable between a main valve closed position at which the main valve seat portion 49 is seated on the main valve seat 47 and a main valve open position at which the main valve seat portion 49 is spaced apart from the main valve seat 47, in a main valve opening direction from the main valve closed position to the main valve open position and in a main valve closing direction from the main valve open position to the main valve closed position.

A concave groove 48 is formed around an outer peripheral portion of the main valve 44 to penetrate in the axial directions X1 and X2. By utilizing the concave groove 48, a main passage 59 is formed between the main valve 44 and the housing 15. When the main valve 44 is located at the main valve closed position, it closes the main passage 59 to disconnect the main passage 59 and the secondary passage 40. When the main valve 44 is located at the main valve open position, it opens the main passage 59 to connect the main passage 59 and the secondary passage 40.

Since the main valve opening direction is the first axial direction X1, the same reference mark "X1" may be hereinafter used for the main valve opening direction. Moreover, since the main valve closing direction is the second axial direction X2, the same reference mark "X2" may be hereinafter used for the main valve closing direction.

The pilot valve 45 has a substantially cylindrical shape, is inserted through the coupling tube member 29, and is displaceable with respect to the coupling tube member 29 in the axial directions X1 and X2. A second axial direction X2 side end portion 55 of the pilot valve 45 loosely fits in the tubular portion 50 of the main valve 44.

The second axial direction X2 side end portion 55 of the pilot valve 45 is provided with a coupling hole 56 which penetrates through the second axial direction X2 side end portion 55 to be orthogonal to an axis (which coincides with the reference axis L10) of the pilot valve 45. The main valve 44 is provided at the tubular portion 50 with a shaft-like coupling member 57 which is orthogonal to an axis (which coincides with the reference axis L10) of the main valve 44. The coupling member 57 is loosely inserted through the coupling hole 56 to couple the pilot valve 45 to the main valve 44. In this state, the pilot valve 45 is displaceable with respect to the main valve 44 in the axial directions X1 and X2.

The second axial direction X2 side end portion 55 of the pilot valve 45 is disposed in the tubular portion 50 of the main valve 44 to be spaced apart from the tubular portion 50, thereby forming a pilot passage 52. Moreover, the main valve 44 is provided at the bottom portion 51 with a valve hole 60 which extends along the reference axis L10, and is further provided with a pilot valve seat 61 which surrounds an opening of the valve hole 60 which is open to the tubular portion 50.

The pilot valve 45 is provided with a pilot valve seat portion 62 at the second axial direction X2 side end portion 55. The pilot valve 45 is displaceable between a pilot valve closed position at which the pilot valve seat portion 62 is seated on the pilot valve seat 61 and a pilot valve open position at which the pilot valve seat portion 62 is spaced apart from the pilot valve seat 61, in a pilot valve opening direction from the pilot valve closed position to the pilot valve open position and a pilot valve closing direction from the pilot valve open position to the pilot valve closed position.

When the pilot valve 45 is located at the pilot valve closed position, it closes the pilot passage 52 to disconnect the pilot passage 52 and the valve hole 60. When the pilot valve 45 is located at the pilot valve open position, it opens the pilot passage 52 to connect the pilot passage 52 and the valve hole 60.

Since the pilot valve opening direction is the first axial direction X1, the same reference mark "X1" may be hereinafter used for the pilot valve opening direction. Moreover, since the pilot valve closing direction is the second axial direction X2, the same reference mark "X2" may be hereinafter used for the pilot valve closing direction.

The movable core 46 is made of a ferromagnetic material and has a substantially cylindrical shape. The movable core 46 includes a guiding portion 66 on the first axial direction X1 side and an outer peripheral passage forming portion 67 on the second axial direction X2 side. The guiding portion 66 is provided with a shaft passage 68 which coincides with an axis (which coincides with the reference axis L10) of the guiding portion 66, extends in the axial directions X1 and X2, and is open in the first axial direction X1. The outer peripheral passage forming portion 67 is provided at its outer peripheral portion with an outer peripheral passage 69 which extends in the axial directions X1 and X2 and is open in the second axial direction X2. Further, the movable core 46 is provided with a communication passage 72 which causes the shaft passage 68 and the outer peripheral passage 69 to be connected to each other.

The movable core 46 fits between the fixed magnetic pole member 26 and the coupling tube member 28. In this state, the guiding portion 66 fits in the non-magnetic guide member 27. A gap between the movable core 46 and the magnetic guide member 28 is larger than a gap between the movable core 46 and the non-magnetic guide member 27, and the movable core 46 is supported and guided by the non-magnetic guide member 27 to be displaceable in the axial directions X1 and X2.

The pilot valve 45 and the movable core 46 are mechanically connected to each other so as to, for example, be threadedly engaged with each other. As above, the pilot valve 45 and the movable core 46 are integrally coupled to each other and is displaced as a single integral structure. Therefore, the structure is smoothly displaced such that the guiding portion 66 of the movable core 46 is guided by the non-magnetic guide member 27.

The coil 17 that is solenoid driving means is energized, in other words, is supplied with electric power to generate a magnetic force, thereby driving the valve 16 by the magnetic force to be displaced. The coil 17 is a solenoid coil and is disposed to have an axis coinciding with the reference axis L10 and to cover at least a part of the fixed magnetic pole member 26 and at least a part of the movable core 46 from radially outwardly. The coil 17 fits in the coil chamber 34 of the outer body 25 of the first housing portion 21 to be supported in a housing 21.

When the coil 17 is energized, it magnetizes the fixed magnetic pole member 26 and the movable core 46 to give the fixed magnetic pole member 26 and the movable core 46 magnetic attractive forces in the axial directions X1 and X2 such that the fixed magnetic pole member 26 and the movable core 46 get close to each other. Thus, the movable core 46 is displaced in the first axial direction X1 to get close to the fixed magnetic pole member 26 that is a part of the housing 15. By displacing the movable core 46, the pilot valve 45 can be displaced in the pilot valve opening direction X1, and further, the main valve 44 coupled to the pilot valve 45 can be displaced in the main valve opening direction X1. Therefore, the coil 17 drives the valve 16 to be displaced in the main valve opening direction X1.

The drive spring member 18 that is elastic pressing means utilizes its spring force, i.e., an elastic recovery force to displace the valve 16. The drive spring member 18 is a compression coil spring, has an axis coinciding with the reference axis L10, and is located between the fixed magnetic pole member 26 and the movable core 46 in the valve chamber space 120.

The fixed magnetic pole member 26 is provided with a magnetic pole member spring receiving concave portion 71 at a second axial direction X2 side end portion thereof. Moreover, the movable core 46 is provided with a core spring receiving concave portion 70 at a first axial direction X1 side end portion thereof. The drive spring member 18 is provided such that a first axial direction X1 side end portion thereof fits in and is supported by the magnetic pole member spring receiving concave portion 71, and a second axial direction X2 side end portion thereof fits in and is supported by the core spring receiving concave portion 70.

The drive spring member 18 applies to the movable core 46 the spring force in the second axial direction X2. With this, the pilot valve 45 can be displaced together with the movable core 46 in the pilot valve closing direction X2 that is the second axial direction, and further, the main valve 44 coupled to the pilot valve 45 can be displaced in the main valve closing direction X2. Thus, the drive spring member 18 drives the valve 16 to be displaced in the pilot valve closing direction X2. The driving force of the drive spring member 18 is smaller than the driving force of the coil 17.

Each of the feeder wire members 19 is means for supplying the coil 17 with electric power. The feeder wire member 19 extends from a portion of the housing 15 exposed from the tank 11, i.e., a portion exposed to the tank outer space 13, to a portion of the housing 15 where the coil 17 is disposed, i.e., the coil chamber 34, to be inserted through the housing 15, thereby being supported by the housing 15. Using a power supply disposed in the tank outer space 13, the drive voltage is applied through the feeder wire member 19 to the coil 17 to energize the coil 17, thereby generating the driving current.

The temperature sensor 150 is temperature detecting means for detecting the temperature of the fluid in the tank inner space 12, and is disposed to project from the housing 15 to the tank inner space 12. Thus, the temperature sensor 150 is disposed in the tank inner space 12. In the present embodiment, the temperature sensor 150 is disposed in the vicinity of the first axial direction X1 side end portion of the second housing portion 22. Also, the position where the temperature sensor 150 is disposed is in the vicinity of a second axial direction X2 side end portion of the first housing portion 21. Therefore, the position where the temperature sensor 150 is disposed is in the vicinity of a position where the housing portions 21 and 22 are coupled to each other.

Each of the signal wire members 151 is means for transmitting to the tank outer space 13 a detection signal indicating a detected temperature that is a detection result detected by the temperature sensor 150. Devices, such as a control unit, are disposed in the tank outer space 13, and the signal wire member 151 is electrically connected to these devices, and is also electrically connected to the temperature sensor 150.

The signal wire member 151 is supported by the housing 15 in such a manner that it extends from the portion of the housing 15 exposed from the tank 11 to the tank outer space 13, to the portion exposed to the tank inner space 12, to be inserted through the housing 15. The signal wire member 151 is disposed to be partially exposed in the tank inner space 12 at the first axial direction X1 side end portion of the second housing portion 22. Moreover, the signal wire member 151 is inserted through the housing 15 to be provided from the first axial direction X1 side end portion of the second housing portion 22 to the tank outer space 13.

Figure 3:
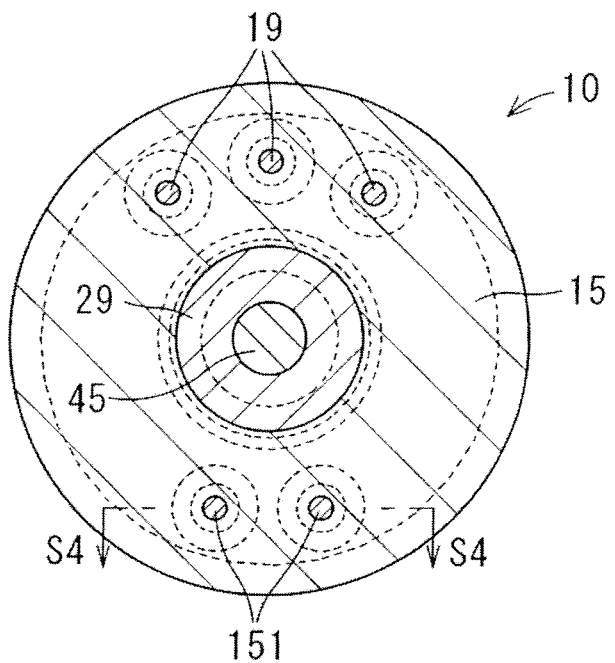
FIG. 3 is a cross-sectional view taken along line S3-S3 of FIG. 1, showing the solenoid on-off valve.

FIG. 3 is a cross-sectional view taken along line S3-S3 of FIG. 1, showing the solenoid on-off valve 10. In the present embodiment, three feeder wire members 19 and two signal wire members 151 are provided. The feeder wire members 19 have the same configuration as each other, and the signal wire members 151 have the same configuration as each other. The feeder wire members 19 are arranged in a circumferential direction of the housing 15 in a circumferential region of the housing 15. The feeder wire members 19 are disposed in a region of about 90 degrees around the reference axis L10. The signal wire members 151 are arranged in the circumferential direction in a circumferential region of the housing 15 which is different from the region where the feeder wire members 19 are disposed. The signal wire members 151 are disposed in a region of about 45 degrees around the reference axis L10. The region where the feeder wire members 19 are disposed and the region where the signal wire members 151 are disposed are different in position from each other at 180 degrees around the reference axis L10.

The housing 15 is provided with wire insertion holes, the number of which is equal to the total of the number of the feeder wire members 19 and the number of the signal wire members 151. In the present embodiment, the housing 15 is provided with five wire insertion holes. The feeder wire members 19 and the signal wire members 151 are disposed to be inserted through the wire insertion holes, respectively.

Figure 4:
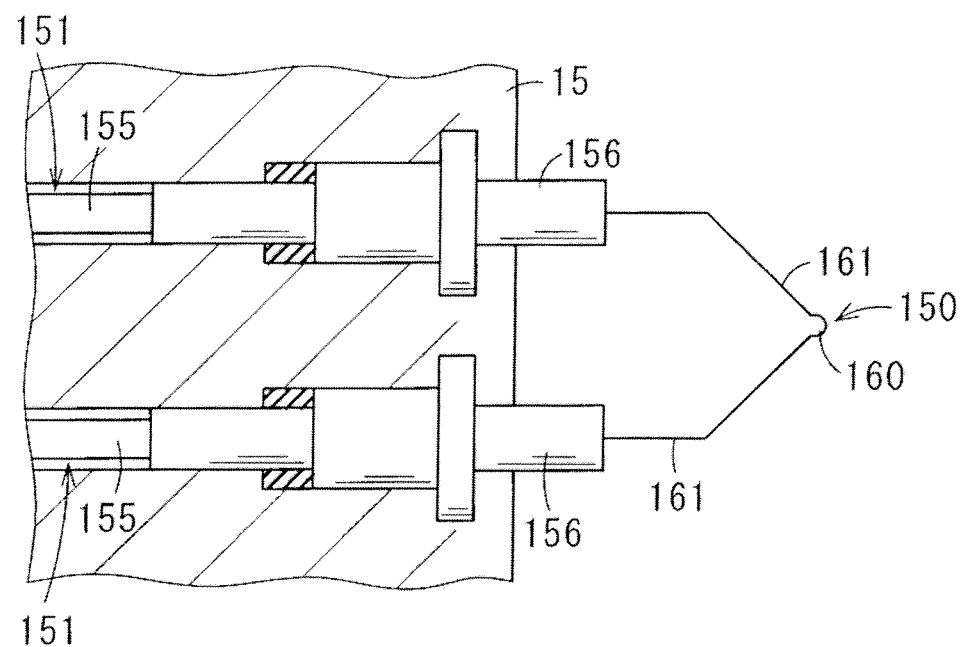
FIG. 4 is a cross-sectional view taken along line S4-S4 of FIG. 3, showing a vicinity of a temperature sensor.

FIG. 4 is a cross-sectional view taken along line S4-S4 of FIG. 3, showing a vicinity of the temperature sensor 150. The temperature sensor 150 includes a temperature sensing portion 160 which outputs as a detection signal an electric signal corresponding to the temperature of the gas, and two sensor lead wires 161 which are electrically connected to a pair of terminals, respectively, of the temperature sensing portion 160. The sensor lead wires 161 are electrically connected to the signal wire members 151, respectively. The temperature sensing portion 160 is not especially limited, and is realized by, for example, a thermocouple, a resistance thermometer bulb, a thermistor or the like in the present embodiment.

Figure 5:
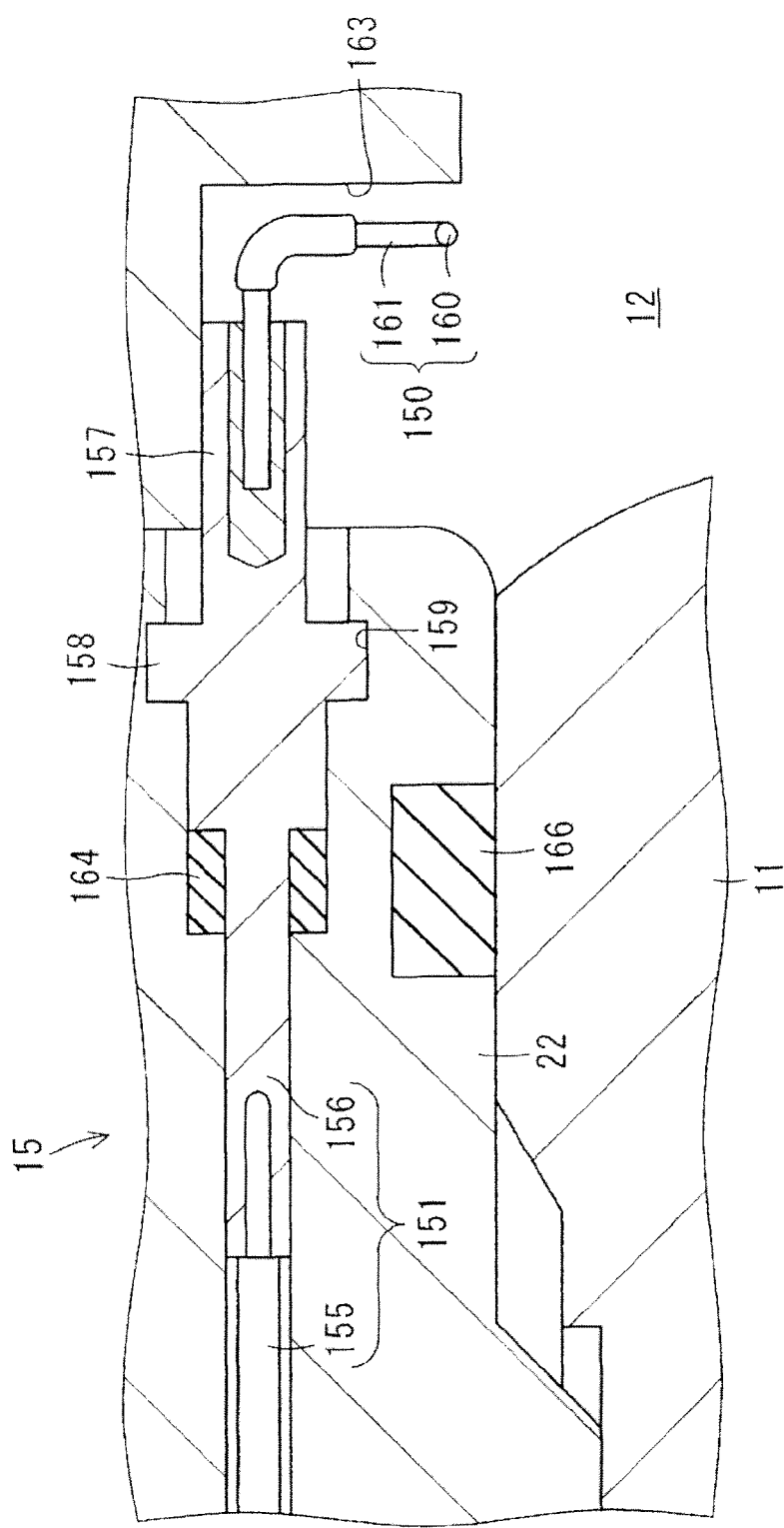
FIG. 5 is a cross-sectional view showing an enlarged vicinity of the temperature sensor.

FIG. 5 is a cross-sectional view showing an enlarged vicinity of the temperature sensor 150. Since the signal wire members 151 have the same configuration as each other, one of the signal wire members 151 will be explained as an example. The signal wire member 151 is supported by the second housing portion 22. The signal wire member 151 includes a signal wire 155 made of an electrically-conductive material and a signal wire terminal socket (hereinafter referred to as "signal socket") 156 made of the electrically-conductive material. One end portion of the signal wire 155 is electrically connected to the signal socket 156. The signal wire member 151 is inserted through the second housing portion 22 in the axial directions X1 and X2 such that the signal socket 156 thereof is located on the first axial direction X1 side.

The signal socket 156 includes: a tubular lead wire fitting portion 157 at a first axial direction X1 side end portion thereof, i.e., an end portion opposite an end portion connected to the signal wire 155; and a flanged signal socket stopper portion 158 which is disposed on the second axial direction X2 side of the lead wire fitting portion 157 to project radially outwardly. The signal socket 156 is disposed such that at least a part of the lead wire fitting portion 157 projects from the second housing portion 22 to the tank inner space 12. Moreover, the signal socket 156 is locked by the second housing portion 22 such that the signal socket stopper portion 158 fits in an annular signal socket stopper concave portion 159 formed on the second housing portion 22. With this, the signal socket 158 is prevented from being displaced in the axial directions X.

The sensor lead wires 161 of the temperature sensor 150 are electrically connected to the signal wire members 151, respectively, such that end portions thereof opposite to end portions thereof connected to the temperature sensing portion 160 are inserted in the lead wire fitting portion 157 of the signal sockets 156 of the signal wire member 151. Moreover, the sensor lead wires 161 are elastically retained by the lead wire fitting portion 157 from radially outwardly. With this, the sensor lead wires 161 are mechanically connected to the signal wire members 151, respectively. Thus, the temperature sensor 150 is supported by the signal wire members 151, and is disposed such that the temperature sensing portion 160 is exposed in the tank inner space 12 to directly contact the gas in the tank inner space 12.

Moreover, the housing 15 is provided at its axially intermediate position with a sensor disposing concave portion 163 which is concave radially inwardly. The sensor disposing concave portion 163 is formed on the resin spacer 37, is open wide, and constitutes a part of the tank inner space 12. The first axial direction X1 side end portion of the second housing portion 22 faces the sensor disposing concave portion 163, and the lead wire fitting portion 157 projects toward the sensor disposing concave portion 163. The temperature sensor 150 is disposed in the sensor disposing concave portion 163, and is back radially inwardly from an outer peripheral surface of the housing 15 excluding the sensor disposing concave portion 163. With this, it is possible to prevent the temperature sensor 150 from contacting components, such as the tank 11, and thereby being damaged when attaching and detaching the solenoid on-off valve 10 to and from the tank 11.

Moreover, an annular signal wiring sealing member 164, such as an O ring, is disposed to externally surround a portion of the signal socket 156 on the second axial direction X2 side of the signal socket stopper portion 158, thereby hermetically sealing between the signal socket 156 and the second housing portion 22. With this, the gas leakage from between the housing 15 and the signal wire member 151 is prevented. Moreover, the signal wiring sealing member 164 is configured to contact the signal socket 156 elastically in the first axial direction X1. The direction of a force applied to the signal socket 156 when inserting the sensor lead wires 161 into the signal socket 156 is the direction of a force which reduces a space where the signal wiring sealing member 164 is disposed. Therefore, the force applied to the signal socket 156 acts in a direction in which the sealing performance improves, thereby achieving high sealing performance.

Further, the signal wiring sealing member 164 is disposed on the same position in light of the axial directions X as a housing sealing member 166 which seals between the second housing portion 22 and the tank 11. With this, the second housing portion 22 is hardly deformed by the pressure of the gas in the tank inner space 12.

Figure 6:
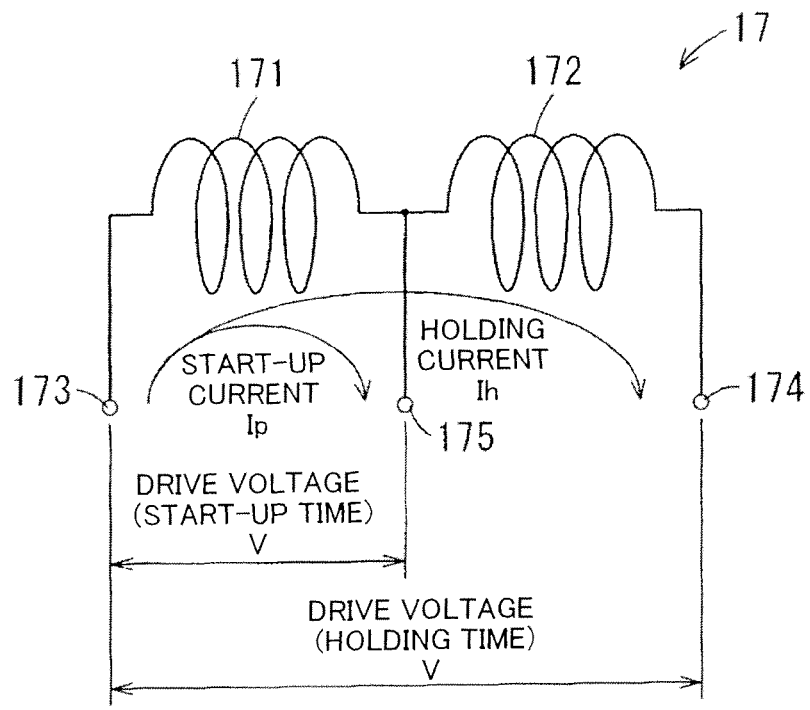
FIG. 6 is a circuit diagram showing a coil.

FIG. 6 is a circuit diagram showing the coil 17. The coil 17 includes a plurality of coil portions. In the present embodiment, the coil 17 includes two coil portions, i.e., a first coil portion 171 and a second coil portion 172. The coil portions 171 and 172 are serially connected to each other such that first end portions thereof are electrically connected to each other. The coil 17 further includes a first terminal 173 electrically connected to a second end portion of the first coil portion 171, a second terminal 174 electrically connected to a second end portion of the second coil portion 172, and a third terminal 175 connected to a connecting point of the first end portions of the coil portions 171 and 172.

The feeder wire members 19 are electrically connected to three or more different connecting points, respectively, of the coil 17, which are arranged in the axial direction, to guide electric power for selectively applying the drive voltage between two of the above three or more connecting points. In the present embodiment, the terminals 173 to 175 of the coil 17 correspond to the connecting points. Therefore, the feeder wire members 19 are connected to the terminals 173 to 175, respectively, of the coil 17 which are three connecting points arranged in the axial direction.

Figure 7:
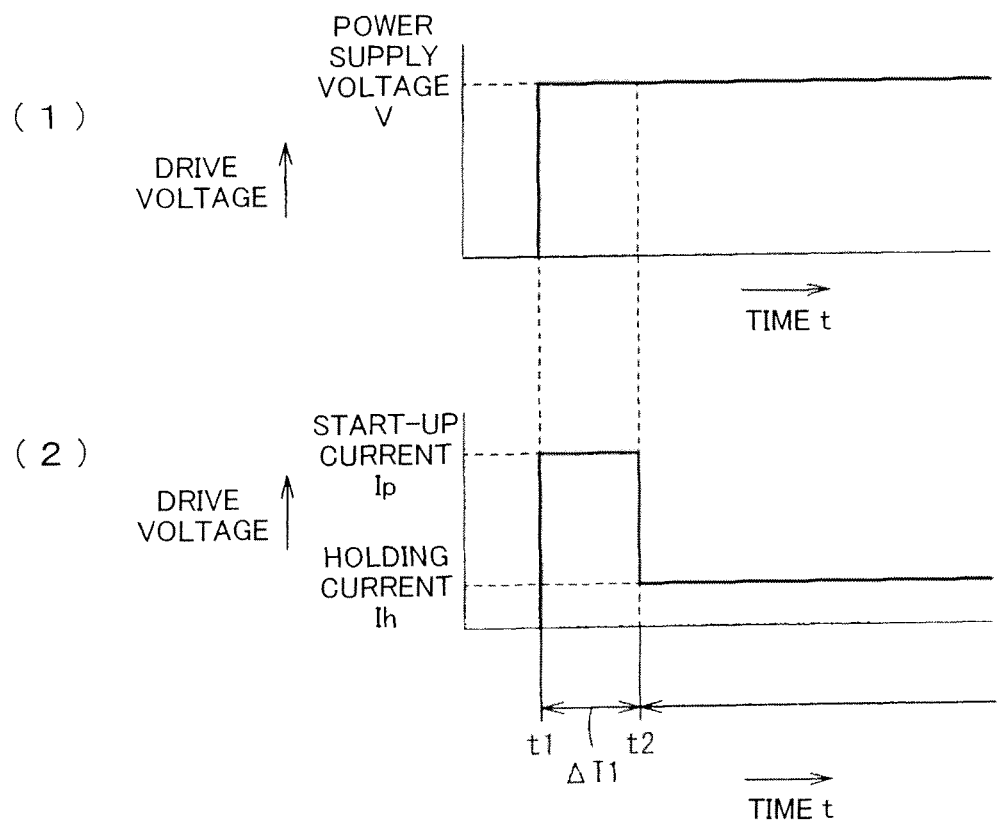
FIG. 7 is a graph showing a drive voltage applied to the coil and a driving current generated in the coil.

FIG. 7 is a graph showing the drive voltage applied to the coil 17 and the driving current generated in the coil 17. Referring to FIGS. 6 and 7, the valve passage 43 is closed when the coil 17 is not energized. From this closed state, an opening operation of opening the valve passage 43 starts at a time t1. In a start-up time immediately after starting the opening operation, the drive voltage of a power supply voltage value V is applied between the first terminal 173 and the third terminal 175. Therefore, in the start-up time, the drive voltage is applied to the first coil portion 171. The start-up time is from the time t1 at which the opening operation starts, to a time t2 at which a predetermined standby time ΔT1 has passed from the time t1. In the start-up time, the driving current of a start-up current value Ip is generated in the first coil portion 171 of the coil 17. The standby time ΔT1 is set to be longer than a necessary time from when the application of the power supply voltage value V to the first coil portion 171 as the drive voltage starts until when the valve passage 43 is fully opened, and at the same time, is set to be as short as possible.

From the time t2, an open state is held. That is, in a holding time of holding the open state, the drive voltage of the power supply voltage value V is applied between the first terminal 173 and the second terminal 174. Therefore, in the holding time, the drive voltage is applied to the entire coil 17 including the first and second coil portion 171 and 172. In the holding time, the driving current of a holding current value Ih is generated in the entire coil 17. The holding current value Ih becomes smaller than the start-up current value Ip due to the increase in resistance of the second coil portion 172. Thus, without controlling the voltage value of the drive voltage, the current value of the driving current generated in the coil 17 can be controlled by selecting between which terminals the drive voltage is applied.

Figure 8:
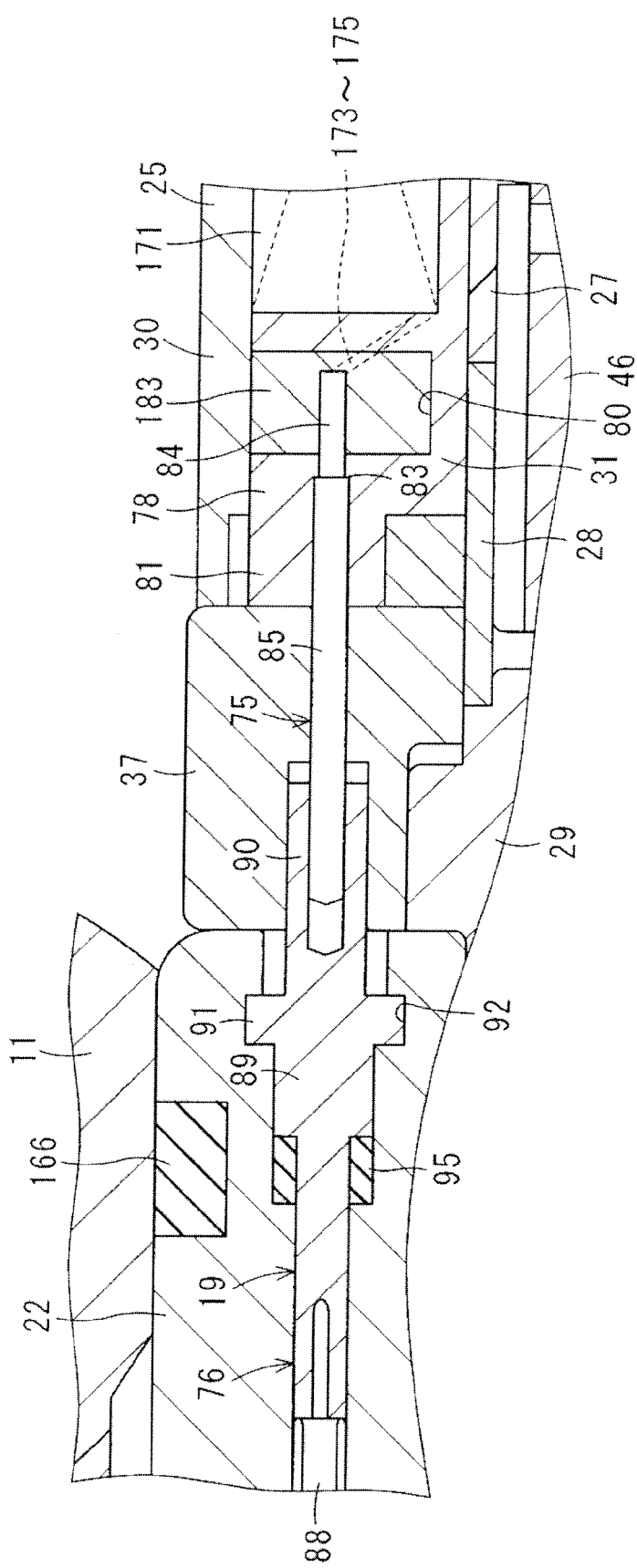
FIG. 8 is a cross-sectional view showing an enlarged part of a feeder wire member.

FIG. 8 is a cross-sectional view showing an enlarged part of the feeder wire member 19. Since the feeder wire members 19 have the same configuration as each other, one of the feeder wire members 19 will be explained as an example. The feeder wire member 19 is connected to the coil 17, and is inserted through the housing 15 to be provided in the tank outer space 13. The feeder wire member 19 includes a first feeder piece 75 supported by the first housing portion 21 and a second feeder piece 76 supported by the second housing portion 22. The feeder pieces 75 and 76 are connected to each other.

The first feeder piece 75 is supported by a flange portion (hereinafter referred to as "supporting flange") 78 of the coil bobbin member 31 of the outer body 25 on the second axial direction X2 side. The supporting flange 78 is provided with a concave portion (hereinafter referred to as "connection concave portion") 80 for storing a connecting portion, and the terminals 173 to 175 of the coil 17 are provided in the connection concave portion 80.

The first feeder piece 75 is realized by a terminal pin made of an electrically-conductive material, has a step portion 83, and is formed such that a first axial direction X1 side portion 84 thereof is smaller in outer diameter than a second axial direction X2 side portion 85 thereof. Hereinafter, the first feeder piece 75 may be referred to as the terminal pin. The first feeder piece 75 is inserted through a portion (hereinafter referred to as "supporting portion") 81 on the second axial direction X2 side of the connection concave portion 80 of the supporting flange 78 in the axial directions X1 and X2 such that the step portion 83 is located in the supporting portion 81. With this, the first feeder piece 75 is supported by the supporting portion 81 so as to be surely prevented from being displaced in the first axial direction X1.

An end portion of the first axial direction X1 side portion 84 of the first feeder piece 75 projects in the connection concave portion 80 to be electrically connected to one of the terminals 173 to 175 of the coil 17 in the connection concave portion 80 by soldering, welding or the like. In this state, the connection concave portion 80 is filled with a filler 183 made of synthetic resin, to protect the connecting portions of the first feeder pieces 75 and the terminals 173 to 175. The second axial direction X2 side portion 85 of the first feeder piece 75 projects from the supporting flange 78 in the second axial direction X2.

The second feeder piece 76 includes a feeder line 88 made of the electrically-conductive material and a feeder line terminal socket (hereinafter referred to as "feeder socket") 89 made of the electrically-conductive material, and the feeder socket 89 is electrically connected to one end portion of the feeder line 88. The second feeder piece 76 is inserted through the second housing portion 22 in the axial directions X1 and X2 such that the feeder socket 89 is located on the first axial direction X1 side. With the first and second housing portions 21 and 22 coupled to each other, the second feeder piece 76 is disposed at a position opposed in the axial directions X1 and X2 to a position where the terminal pin 85, i.e., the first feeder piece is disposed.

The feeder socket 89 includes: a tubular pin fitting portion 90 at a first axial direction X1 side end portion thereof which is opposite an end portion thereof connected to the feeder line 88; and a radially outwardly projecting flanged feeder socket stopper portion 91 on the second axial direction X2 side of the pin fitting portion 90. The feeder socket 89 is disposed such that the first axial direction X1 side portion thereof partially projects from the second housing portion 22 in the first axial direction X1. Moreover, the feeder socket 89 is locked by the second housing portion 22 such that the feeder socket stopper portion 91 fits in an annular feeder socket stopper concave portion 92 formed on the second housing portion 22. With this, the feeder socket 89 is prevented from being displaced in the second axial direction X2.

A portion of the terminal pin 75 that is the first feeder piece which portion projects from the supporting portion 81 in the second axial direction X2 is inserted into the spacer 37. Moreover, a portion of the feeder socket 89 of the second feeder piece 76 which portion projects from the second housing portion 22 is inserted into the spacer 37. In the spacer 37, the terminal pin 75 is partially inserted into the pin fitting portion 90 of the feeder socket 89 to be elastically retained by the pin fitting portion 90. Thus, the first and second feeder pieces 75 and 76 are mechanically and electrically connected to each other.

The first and second housing portions 21 and 22 are coupled to each other such that, first, the insertion body 24 is coupled to the second housing portion 22, and then, the outer body 25 is caused to get close to the second housing portion 22 to be externally fitted to and attached to the insertion body 24. When the first and second housing portions 21 and 22 are coupled to each other, the first and second feeder pieces 75 and 76 are caused to be supported in advance by the first and second housing portions 21 and 22, respectively. This prevents the terminal pin 75 from being displaced in the first axial direction X1 and prevents the feeder socket 89 from being displaced in the second axial direction X2. That is, this prevents the feeder socket 89 from being displaced due to a force generated when inserting the terminal pin 75 into the feeder socket 89. On this account, by causing the first and second housing portions 21 and 22 to be coupled to each other, the terminal pin 75 is inserted into the feeder socket 89, and thereby the first and second feeder pieces 75 and 76 are connected to each other.

Moreover, an annular feeder wiring sealing member 95, such as an O ring, is disposed to externally surround a portion of the feeder socket 89 on the second axial direction X2 side of the stopper portion 91, thereby hermetically sealing between the feeder socket 89 and the second housing portion 22. With this, the gas leakage from between the housing 15 and the feeder wire member 19 is prevented even if the feeder wire member 19 is disposed in the housing 15. Moreover, the sealing member 95 is disposed in such a space that the stopper portion 91 of the terminal pin 89 is located on the first axial direction X1 side and a part of the second housing portion 22 is located on the second axial direction X2 side. The direction of a force applied to the feeder socket 89 when inserting the terminal pin 75 into the feeder socket 89 is the direction of a force which reduces a space where the sealing member 95 is disposed. Therefore, the force applied to the feeder socket 89 acts in a direction in which the sealing performance improves, thereby achieving high sealing performance.

Further, the feeder wiring sealing member 95 is disposed on the same position in light of the axial directions X as the housing sealing member 166 which seals between the second housing portion 22 and the tank 11. With this, the second housing portion 22 is hardly deformed by the pressure of the gas in the tank inner space 12.

Referring again to FIGS. 1 and 2, the solenoid on-off valve 10 is attached to the tank 11 in such a manner that the first axial direction X1 side portion thereof is inserted into the tank inner space, and the external thread formed on the outer peripheral portion of the second housing portion 22 is utilized to be threadedly engaged with the tank 11. Thus, the solenoid on-off valve 10 is attached to the tank 11 such that major components, such as the valve 16 and the coil 17, are disposed within the tank 11.

The coupling tube member 29 of the solenoid on-off valve 10 is provided with a bypass passage 99 which penetrates through the coupling tube member 29 in the axial directions X1 and X2. The housing 15 includes: a primary portion having the primary passage 39, the shaft passage 68, the communication passage 72, the outer peripheral passage 69 and the bypass passage 99; an open-close portion having the main passage 59, the pilot passage 52 and the valve hole 60; and a secondary portion having the secondary passage 40, and the valve passage 43 is formed in the housing 15 to cause the primary port 41 and the secondary port 42 to be connected to each other. The open-close portion of the valve passage 43 includes two passages, i.e., a passage having the main passage 59 and a passage having the pilot passage 52 and the valve hole 60.

When the coil 17 is not supplied with electric power, the valve 16 is driven by the spring force of the drive spring member 18 to be located at the closed position. Specifically, the main valve 44 is located at the main valve closed position, and the pilot valve 45 is located at the pilot valve closed position. With this, both the main passage 59 and the pilot passage 52, i.e., the above two passages are closed. Thus, since the solenoid on-off valve 10 is in the closed state such that the valve passage 43 is closed and the primary port 41 and the secondary port 42 are disconnected, the discharge of the gas in the tank inner space 12 to the tank outer space 13 is prevented.

When electric power is supplied to the coil 17 through the feeder wire member 19, the movable core 46 and the pilot valve 45 are displaced in the pilot valve opening direction X1 by the magnetic force of the coil 17. Then, the pilot passage 52 opens, and the primary port 41 and the secondary port 42 are connected to each other via the pilot passage 52. Thus, the gas is discharged to the tank outer space 13.

At this time, the main valve 44 receives in the main valve closing direction X2 a primary pressure that is the pressure of the gas introduced from the tank inner space 12 to the primary port 41, and receives in the main valve opening direction X1 a secondary pressure that is the pressure of the gas introduced from the tank outer space 13 to the secondary port 42. An effective primary pressure receiving area which effectively receives the primary pressure and an effective secondary pressure receiving area which effectively receives the secondary pressure are equal to each other. The difference between the primary pressure and the secondary pressure is large immediately after the pilot valve 45 is opened. Moreover, the main valve 44 is receiving a gas pressure driving force in the main valve closing direction X2 as a resultant force of the primary pressure and the secondary pressure. Therefore, the main valve 44 remains at the main valve closed position, and the pilot valve 45 is displaced in the main valve opening direction X1 until the coupling hole 56 contacts the coupling member 57 of the tubular portion 50, to open the pilot passage 52, thereby connecting the pilot passage 52 and the valve hole 60 each other. Thus, when the pilot valve 45 opens, and the gas is discharged in this state, the secondary pressure gradually increases, so that the difference between the primary pressure and the secondary pressure gradually becomes small. The gas pressure driving force decreases in this way. Then, the magnetic force of the coil 17 becomes stronger than the gas pressure driving force applied to the main valve 44 in the main valve closing direction X2. Thus, the main valve 44 coupled to the pilot valve 45 is also displaced in the main valve opening direction X1. Therefore, the main passage 59 opens, and the gas is discharged through the pilot passage 52 and the main passage 59 to the tank outer space 13. By such two-stage operation, the valve 16 carries out the opening operation, and the solenoid on-off valve 10 becomes the open state.

When the supply of the electric power to the coil 17 stops in the open state of the solenoid on-off valve 10, the valve 16 is displaced in the main valve closing direction X2 by the spring force of the drive spring member 18 to return to the closed state. Thus, the solenoid on-off valve 10 can open and close the valve passage 43 to control the discharge of the gas in the tank inner space 12.

In the solenoid on-off valve 10 of the present embodiment, the coil 17 is supplied with electric power, and the valve 16 is displaced by a magnetic action. The valve 16 is the two-stage valve. As described above, the valve 16 is configured to open the valve passage 43 by the two-stage opening operation, and can utilize the driving force generated by the gas pressure, to carry out the opening operation. Therefore, the driving force generated by the coil 17 can be small. On this account, the coil 17 can be reduced in size to reduce the size of the solenoid on-off valve 10.

Further, three feeder wire members 19 are disposed to be electrically connected to the terminals 173 to 175, respectively, which are three or more different connecting points of the coil 17 which are arranged in the axial direction. Moreover, the drive voltage is selectively applied between two of the terminals 173 to 175. With this, without controlling the drive voltage, the current value of the driving current which energizes the coil 17 can be changed by selecting between which terminals the drive voltage is applied. Therefore, without controlling the drive voltage, it is possible to suppress wasting electric power in such a manner that the driving current of the large current value is generated in the start-up time, and the current value of the driving current is made small in the holding time. Thus, it is possible to realize a convenient solenoid on-off valve.

As above, the electric power for driving the valve 16 is supplied to the coil 17 through the feeder wire members 19. The feeder wire member 19 extends from the portion of the housing 15 exposed from the tank 11 to the portion where the coil 17 is disposed, to be inserted through the housing 15, thereby being supported by the housing 15. Since the feeder wire member 19 is inserted through the housing 15 to be supported by the housing 15, the feeder wire member 19 is protected from externally applied vibrations and impacts. Thus, the reliability of the vibration resistance and impact resistance of the feeder wire member 19 can be increased, thereby increasing the reliability of the solenoid on-off valve 10. In addition, by storing the feeder wire member 19 in the housing 15, the feeder wire member 19 can be disposed neatly in the housing 15. Thus, the solenoid on-off valve 10 can be reduced in size and simplified, that is, can be made compact. Therefore, it is possible to obtain the solenoid on-off valve 10 which is highly reliable and compact.

Moreover, the feeder wire member 19 includes a plurality of feeder pieces. In the present embodiment, the feeder wire member 19 includes the first and second feeder pieces 75 and 76. The feeder pieces 75 and 76 are supported by the first and second housing portions 21 and 22, respectively, which constitute the housing 15. By causing the housing portions 21 and 22 to be coupled to each other, the feeder pieces 75 and 76 are connected to each other. Thus, the coupling operation of the housing portions 21 and 22 and the connecting operation of the feeder pieces 75 and 76 do not have to be carried out separately, and the feeder wire members 19 can be disposed in the housing 15 constructed by causing the housing portions 21 and 22 to be coupled to each other. Therefore, it is possible to realize the solenoid on-off valve 10 which is small, simple in configuration, and easy to assemble.

Moreover, the feeder pieces 75 and 76 are connected to each other such that the pin-shaped end portion of the feeder piece 75 is inserted into the socket-shaped end portion of the feeder piece 76 to be elastically retained by the socket-shaped end portion. Thus, the feeder pieces 75 and 76 can be connected to each other, and it is possible to realize the feeder wire member 19 which can be formed by causing the housing portions 21 and 22 to be coupled to each other. Therefore, the feeder pieces 75 and 76 can be connected to each other simultaneously with the simple coupling operation of the housing portions 21 and 22. Thus, it becomes easy to assemble.

Moreover, the feeder wiring sealing member 95 is disposed between the housing 15 and the feeder wire member 19. By disposing the sealing member 15, it is possible to prevent the gas from leaking from between the housing 15 and the feeder wire member 19. Therefore, it is possible to realize the preferable solenoid on-off valve 10. Moreover, a comparatively thick insulating film is formed on an outer peripheral surface of the feeder socket 89 to secure electric insulation between the feeder socket 89 and the second housing portion 22 and to realize high adhesion between the feeder socket 89 and the sealing member, thereby improving the sealing performance.

Moreover, the solenoid on-off valve 10 is provided with the temperature sensor 150. The temperature sensor 150 projects from the housing 15 to the tank inner space 12 to detect the temperature of the gas in the tank inner space 12. The detected temperature can be utilized to, for example, control opening and closing of the valve passage. As above, the temperature sensor 150 disposed in the tank inner space 12 can directly detect the temperature of the gas in the tank inner space 12, and can give the signal indicating the detected temperature through the signal wire members 151 to a device disposed in the tank outer space 13. The gas is not introduced to the housing 15 in order to detect the temperature of the gas, but the temperature sensor 150 is disposed in the tank inner space 12 to detect the temperature of the gas in the tank inner space 12. Therefore, the temperature sensor 150 can detect the temperature of the gas without being influenced by the heat capacity of the housing 15. On this account, the response of the temperature sensor 150 to the gas temperature changes can be made satisfactory. Thus, it is possible to obtain a convenient solenoid on-off valve.

Further, the signal wire member 151 for realizing the temperature detection by the temperature sensor 150 disposed in the tank inner space 12 is inserted through the housing 15 to be supported by the housing 15. With this, the signal wire member 151 is protected from externally applied vibrations and impacts. Thus, the reliability of the vibration resistance and impact resistance of the signal wire member 151 can be increased. Moreover, by storing the signal wire member 151 in the housing 15, the signal wire member 151 can be disposed neatly. Thus, the solenoid on-off valve 10 can be reduced in size and simplified, that is, can be made compact. Therefore, it is possible to obtain the solenoid on-off valve 10 which is highly reliable and compact.

Moreover, the signal wiring sealing member 164 is disposed between the housing 15 and the signal wire member 151 to seal between the housing 15 and the signal wire member 151. With this, it is possible to prevent the gas from leaking from between the housing 15 and the signal wire member 151. Therefore, it is possible to realize the preferable solenoid on-off valve 10. Moreover, a comparatively thick insulating film is formed on an outer peripheral surface of the signal socket 156 to secure electric insulation between the signal socket 156 and the second housing portion 22 and to realize high adhesion between the signal socket 156 and the sealing member, thereby improving the sealing performance. Further, the temperature sensor 150 can be configured such that the temperature sensing portion 160 for sensing the temperature is not covered by a protecting tube or the like but is exposed in the inner space. Thus, it is possible to reduce the heat capacity of the temperature sensor 150 itself. With this, the response of the temperature sensor 150 to the gas temperature changes can be further improved.

Further, the temperature sensor 150 is disposed to be fitted into the sensor disposing concave portion 163 formed on the housing 15. With this, it is possible to prevent the temperature sensor 150 from contacting components, such as the tank 11, when attaching and detaching the solenoid on-off valve 10 to and from the tank 11. Therefore, it is possible to prevent the temperature sensor 15 from being damaged.

In addition, the sensor disposing concave portion 163 is configured to open wide, be a part of the tank inner space 12 and cause the gas in the tank inner space 12 to easily flow through the sensor disposing concave portion 163. With this, the response of the temperature sensor 150 to the gas temperature changes can be further improved. In addition, the temperature sensor 160 is disposed in the sensor disposing concave portion 163 to be as close as the surface of the housing 15. With this, the temperature sensor 150 hardly contacts the other components.

Moreover, the primary port 41 is formed on the end portion of the housing 15 which portion is disposed in the tank inner space 12 in the axial directions X1 and X2. By forming the primary port 41 on the end portion of the housing 15, the number of restrictions in the case of configuring such that the primary port 41 opens in the tank inner space 12 can be reduced, as compared with a case where the primary port which is open in a direction crossing the reference axis L10 is formed at an intermediate position in the axial directions X1 and X2. With this, it is possible to make the solenoid on-off valve 10 compact.

Figure 9:
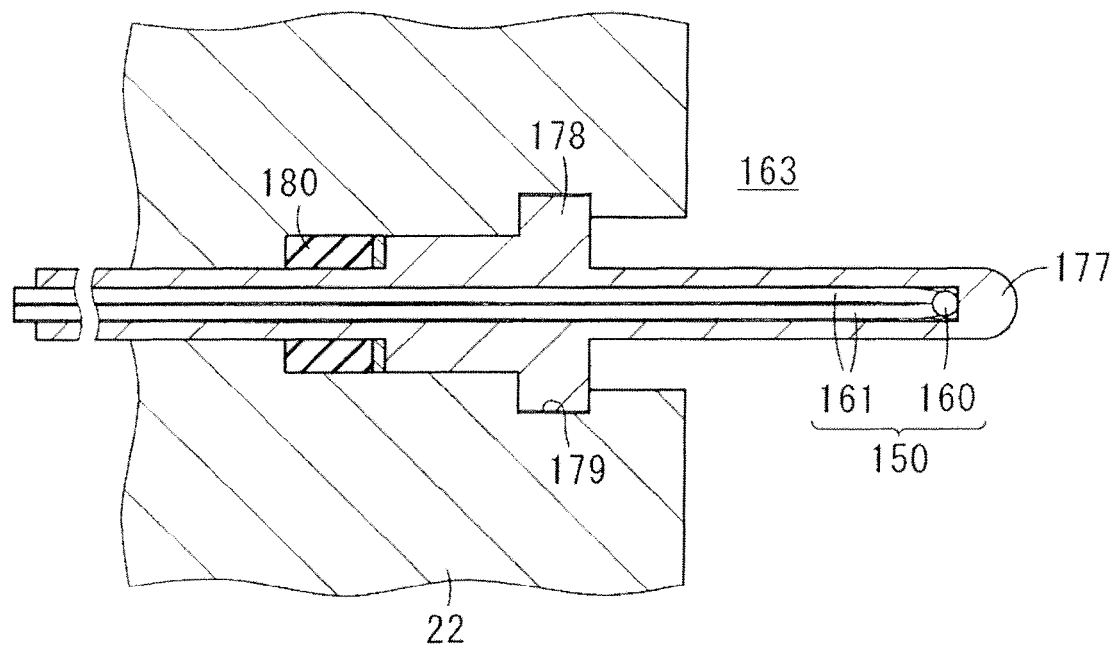
FIG. 9 is a cross-sectional view showing an arrangement structure of the temperature sensor of another embodiment of the present invention.
Figure 10:
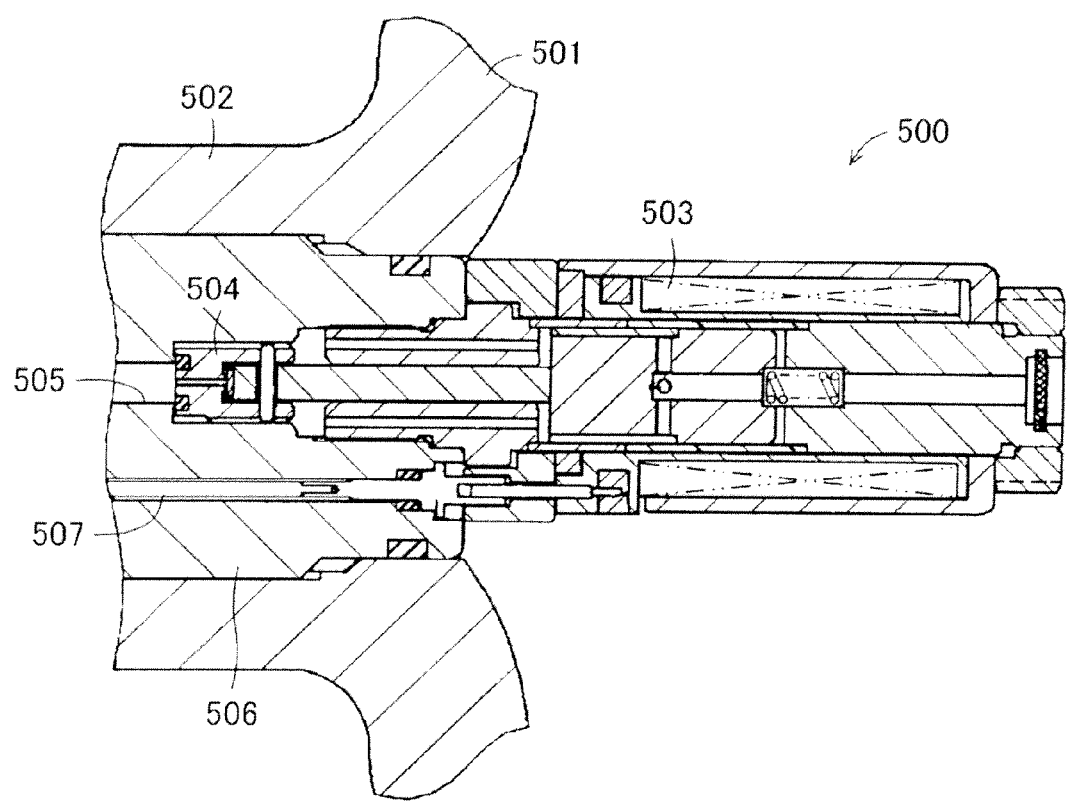
FIG. 10 is a cross-sectional view taken along a plane including an axis of a part of a solenoid valve of the prior art.
Figure 11:
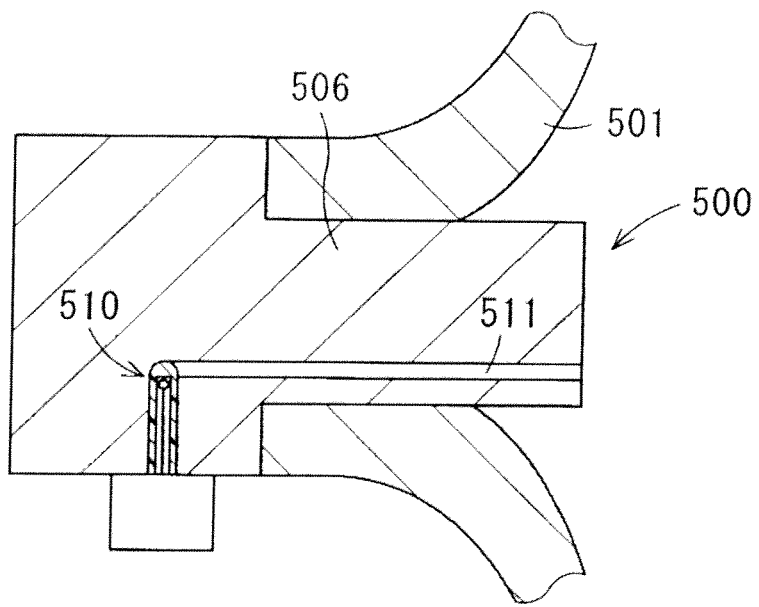
FIG. 11 is a cross-sectional view simplistically showing the solenoid valve.
Figure 12:
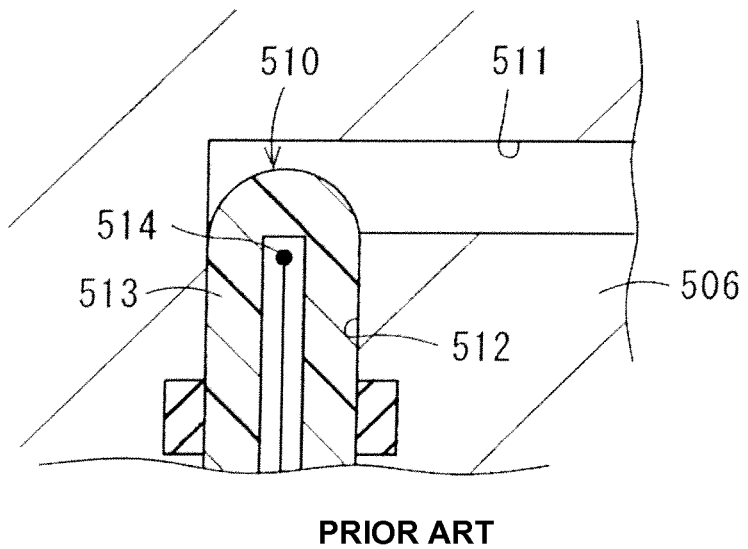
FIG. 12 is a cross-sectional view showing an enlarged vicinity of the temperature sensor of the solenoid valve.
Figure 13:
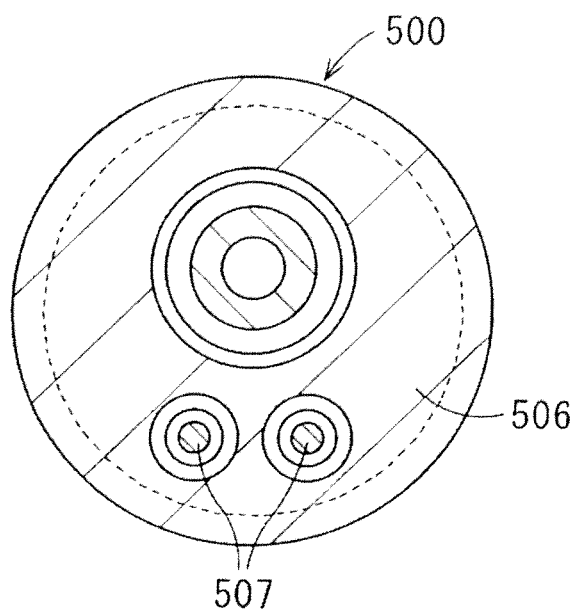
FIG. 13 is a cross-sectional view taken along a plane perpendicular to the axis of the solenoid valve.
Figure 14:
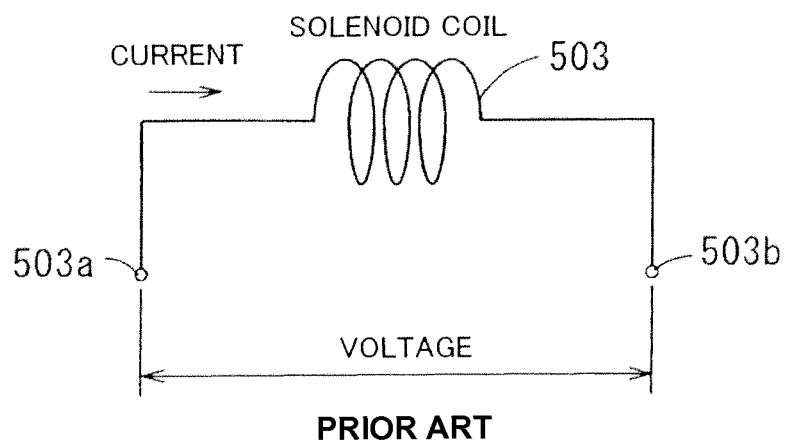
FIG. 14 is a circuit diagram showing a coil.
Figure 15:
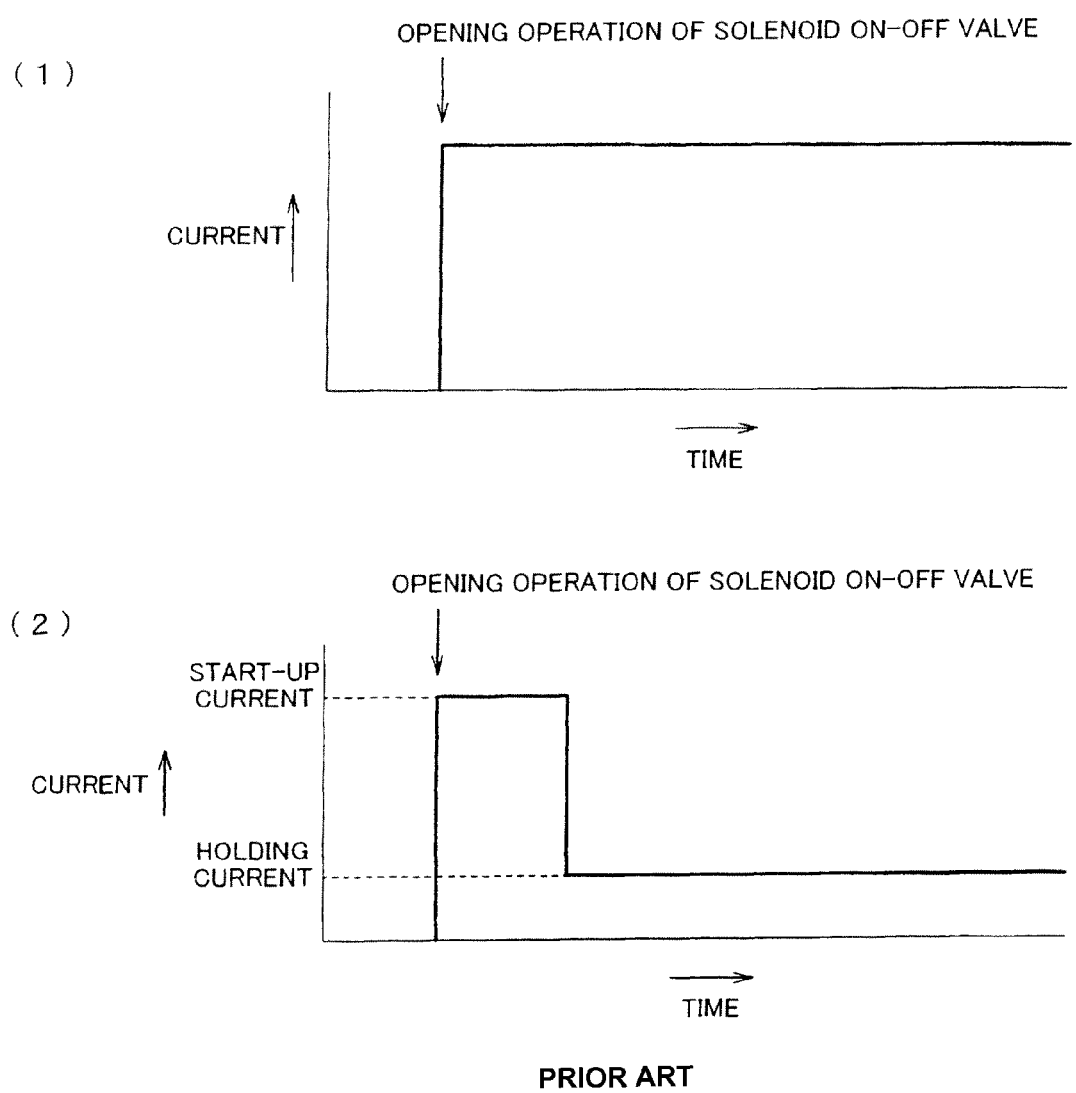
FIG. 15 is a graph showing a driving current for energizing the coil.

FIG. 9 is a cross-sectional view showing an arrangement structure of the temperature sensor 150 of another embodiment of the present invention. Same reference numbers are used for members corresponding to the members of the embodiment shown in FIGS. 1 to 8, and only different members will be explained. In the present embodiment, only one wire insertion hole through which the signal wire member 151 is inserted is formed. A bottomed protecting tube 177 is disposed to be partially inserted in the wire insertion hole for the signal wire and project in the sensor disposing concave portion 163.

The protecting tube 177 is provided with a flanged protecting tube stopper portion 178. The protecting tube 177 is supported by the second housing portion 22 such that the protecting tube stopper portion 178 fits in a protecting tube stopper concave portion 179 of the second housing portion 22 to be prevented from being displaced in the axial directions X. An annular protecting tube sealing member 180, such as an O ring, is disposed to externally surround a portion of the protecting tube 177 on the second axial direction X2 side of the protecting tube stopper portion 178, thereby hermetically sealing between the protecting tube 177 and the second housing portion 22. With this, the gas leakage from between the housing 15 and the protecting tube 177 is prevented.

Further, in light of the axial directions X, the protecting tube sealing member 180 is disposed on the same position as the housing sealing member 166 (see FIG. 5) which seals between the second housing portion 22 and the tank 11. With this, the second housing portion 22 hardly receives the transforming force generated by the pressure of the gas in the tank inner space 12.

The temperature sensor 150 is disposed to be stored in the protecting tube 177. The temperature sensing portion 160 of the temperature sensor 150 projects from the housing 15 to the sensor disposing concave portion 163. In the present embodiment, each signal wire member 151 is configured not to include the above-described signal socket 156 (see FIG. 5), and only the signal wire 155 is included. The signal wires 155 are inserted through the single wire insertion hole to be electrically connected to the sensor lead wires 161, respectively, of the temperature sensor 150 in the wire insertion hole.

The temperature sensor 150 configured as above is influenced by the heat capacity of the protecting tube 177. However, as compared with the configuration of causing the gas to be introduced into the housing 15 to detect the temperature of the gas as in the prior art, it is possible to reduce the influence of the heat capacity of the housing 15. Therefore, even in this configuration, it is possible to obtain the satisfactory response of the temperature sensor 150 as compared with the prior art. Moreover, even in this configuration, by disposing the temperature sensor 150 in the sensor disposing concave portion 163, the temperature sensor 150 is hardly damaged. Further, since the number of the wire insertion holes can be reduced, it is possible to facilitate manufacturing.

The above embodiments are just exemplifications of the present invention, and the configurations of the embodiments can be modified within the scope of the present invention. For example, the position of the temperature sensor 150 is not limited to the above-described position, and may be anywhere in the tank inner space 12. For example, the temperature sensor 150 may be disposed in the vicinity of a first axial direction X1 side end portion of the first housing portion 21. Moreover, although the coil 17 is configured to include two coil portions 171 and 172 and three terminals 173 to 175, the coil 17 may be configured to include four or more terminals, which are disposed on different positions in the axial direction. Moreover, the present embodiments may be carried out as a valve device other than the solenoid valve, and may be carried out as a valve device attached to a pressure apparatus other than the tank.

Further, in a case where the tank 11 is used in the natural gas vehicle or the fuel cell vehicle, in order to secure the pressure strength of the tank, generally, carbon fiber is wound (winding) around the surface of a tank liner made of metal or resin, and an adhesive is used to bond carbon fiber (filament) when winding. However, in a case where the tank 11 is a compressed hydrogen gas tank of the fuel cell vehicle or the like, when filling the tank with the hydrogen gas, the temperature of the gas in the tank may increase steeply, or when the vehicle climbs a slope at high speed, the temperature of the gas in the tank may be decreased steeply to several tens of degrees below zero. Therefore, such abnormal temperature increase or decrease may deteriorate the adhesive in the tank 11, and this may decrease the pressure strength of the tank. On this account, it is necessary for the tank 11 to avoid abnormal temperature changes. Even in such cases, in accordance with the valve device of the above-described embodiments, the temperature sensor 150 which is excellent in response can detect the temperature of the gas in the tank 11. Therefore, it is possible to avoid the abnormal temperature changes by preventing the gas filling and the high-speed slope driving, which are causes of the abnormal temperature changes.

INDUSTRIAL APPLICABILITY

A valve device according to the present invention is useful as a solenoid valve disposed on a tank of a natural gas vehicle or a fuel cell vehicle.

The invention claimed is:

1. A valve device comprising:
    a housing which is attached to a pressure apparatus handling fluid, to be partially exposed from the pressure apparatus, and which has a valve passage of causing an inner space and outer space of the pressure apparatus to be connected to each other;
    a valve which is disposed to be displaceable in the housing, and is displaced to change an opening degree of the valve passage;
    temperature detecting means disposed to project from the housing into the inner space of the pressure apparatus, for detecting a temperature of the fluid in the inner space of the pressure apparatus;
    a sensor disposing concave portion formed on an outer peripheral surface of a portion of the housing, the sensor disposing concave portion exposed in the inner space of the pressure apparatus so as to form a part of the inner space of the pressure apparatus and surround the temperature detecting means;
    a signal wire member which extends from a portion of the housing exposed in the outer space of the pressure apparatus to the portion of the housing exposed in the inner space of the pressure apparatus, the signal wire member to be inserted through the housing, thereby being supported by the housing, the signal wire member further being electrically connected to the temperature detecting means;
    the temperature detecting means including a temperature sensing portion;
    wherein the temperature sensing portion is surrounded by the sensor disposing concave portion and is exposed in the inner space of the pressure apparatus;
    solenoid driving means including a coil, for generating a magnetic force by energization of the coil to drive the valve to be displaced by the magnetic force; and
    feeder wire members which extend from the portion of the housing exposed in the outer space of the pressure apparatus to a portion of the housing where the coil is disposed, to be inserted through the housing, thereby being supported by the housing, which are electrically connected to three or more different connecting points, respectively, of the coil which points are arranged in an axial direction, and which guide electric power for selectively applying a drive voltage between two of the connecting points.

2. The valve device according to claim 1, further comprising sealing means for sealing between the housing and the signal wire member.

3. The valve device according to claim 1, wherein:
    the coil includes a first coil portion and a second coil portion;
    the valve device further comprises a coil bobbin member including an upper end outwardly extending flange portion at an upper end portion thereof, an intermediate outwardly extending flange portion at an intermediate portion thereof, and a lower end outwardly extending flange portion at a lower end portion thereof, the first coil portion provided between the upper end outwardly extending flange portion and the intermediate outwardly extending flange portion, and the second coil portion provided between the intermediate outwardly extending flange portion and the lower end outwardly extending flange portion; and
    a first connecting point provided at an end portion of the first coil portion, a second connecting point provided at an end portion of the second coil portion, and a third connecting point provided between the first coil portion and the second coil portion such that the first coil portion and the second coil portion are connected to one another in series.

4. A valve device comprising:
    a housing arranged for attachment to a pressure apparatus, the housing arranged to be partially exposed to an inner space of the pressure apparatus, the housing including a valve passage arranged to connect the inner space to an outer space;
    a valve disposed in the housing, the valve arranged to shift along a reference axis to open and close the valve passage;
    a concave portion formed on an outer peripheral surface of the housing, the concave portion arranged to be exposed to the inner space and to form a part of the inner space when the housing is attached to the pressure apparatus;
    a temperature detector including a temperature sensing portion, the temperature sensing portion arranged to detect a temperature of a fluid in the inner space;
    a signal wire positioned to extend from a portion of the housing disposed adjacent the outer space to a portion of the housing disposed adjacent to and exposed to the inner space, the signal wire disposed parallel to the reference axis and extending into and exposed to the inner space, the signal wire being insertable through the housing and being supported by the housing, the signal wire being electrically connected to the temperature detector; and
    wherein the temperature sensing portion projects from the housing and is disposed within the concave portion with the temperature sensing portion exposed to the inner space;
    solenoid driving means including a coil for generating a magnetic force by energization of the coil to drive the valve to be displaced by the magnetic force; and
    feeder wire members which extend from the portion of the housing exposed in the outer space of the pressure apparatus to a portion of the housing where the coil is disposed, the feeder wire members arranged to be inserted through the housing and thereby being supported by the housing, the feeder wire members arranged to be electrically connected to three or more different connecting points, respectively, of the coil, the connecting points arranged in an axial direction, the feeder wire members arranged to guide electric power for selectively applying a drive voltage between two of the connecting points.

5. The valve device of claim 4, wherein the temperature sensing portion extends laterally relative to the reference axis.

6. The valve device of claim 4, wherein the concave portion is formed at least in part by a flange coupled to the housing and extending laterally relative to the reference axis.

* * * * *

UNITED STATES PATENT AND TRADEMARK OFFICE
CERTIFICATE OF CORRECTION

PATENT NO.       : 8,413,951 B2                                    Page 1 of 1
APPLICATION NO.  : 12/281305
DATED            : April 9, 2013
INVENTOR(S)      : Nomichi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this
First Day of September, 2015

Michelle K. Lee
*Director of the United States Patent and Trademark Office*